Dec. 12, 1944. E. O. ROGGENSTEIN 2,364,759
RECORDING AND COMPUTING MACHINE
Filed Oct. 18, 1941 20 Sheets-Sheet 2

Dec. 12, 1944.  E. O. ROGGENSTEIN  2,364,759
RECORDING AND COMPUTING MACHINE
Filed Oct. 18, 1941   20 Sheets-Sheet 6

INVENTOR
E.O.ROGGENSTEIN
BY John L Sterling
ATTORNEY

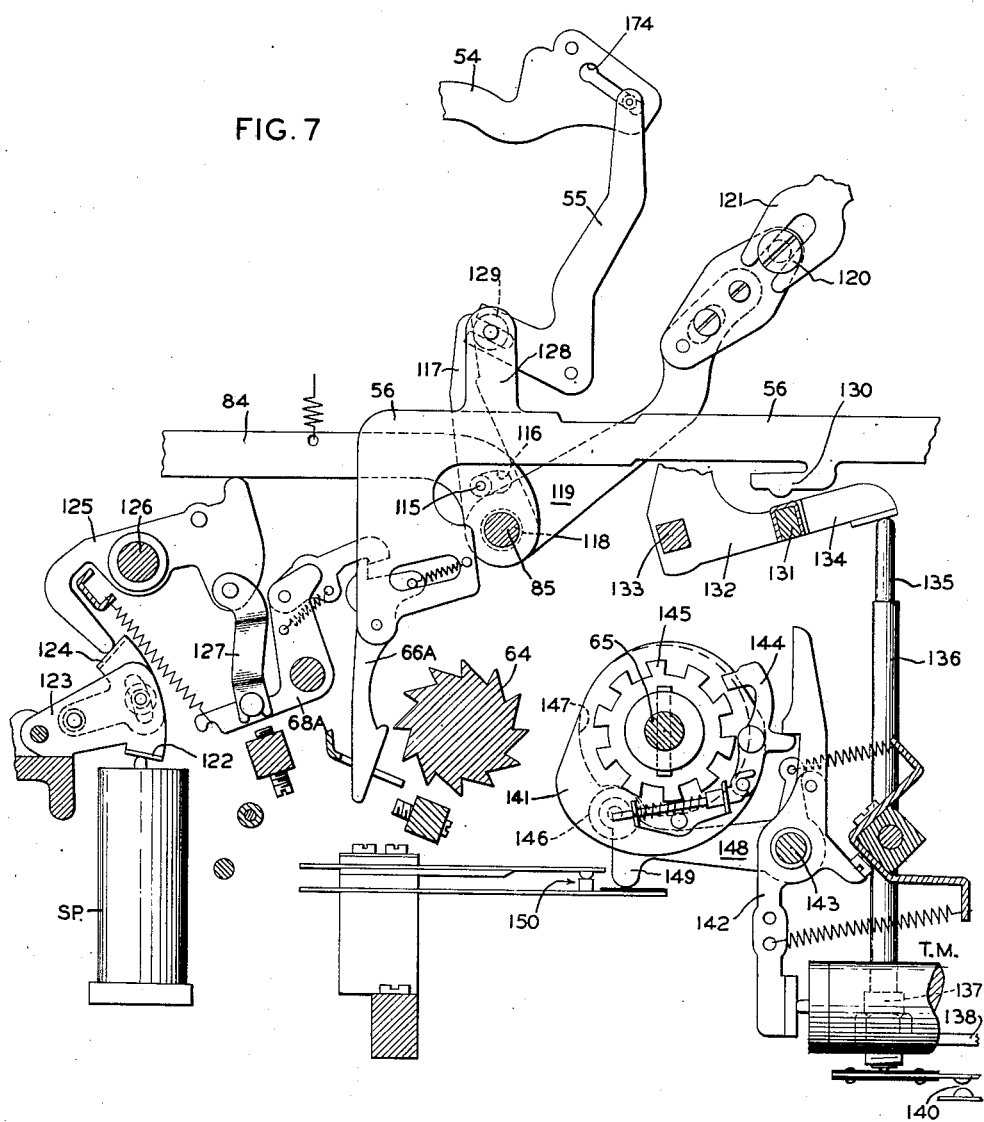

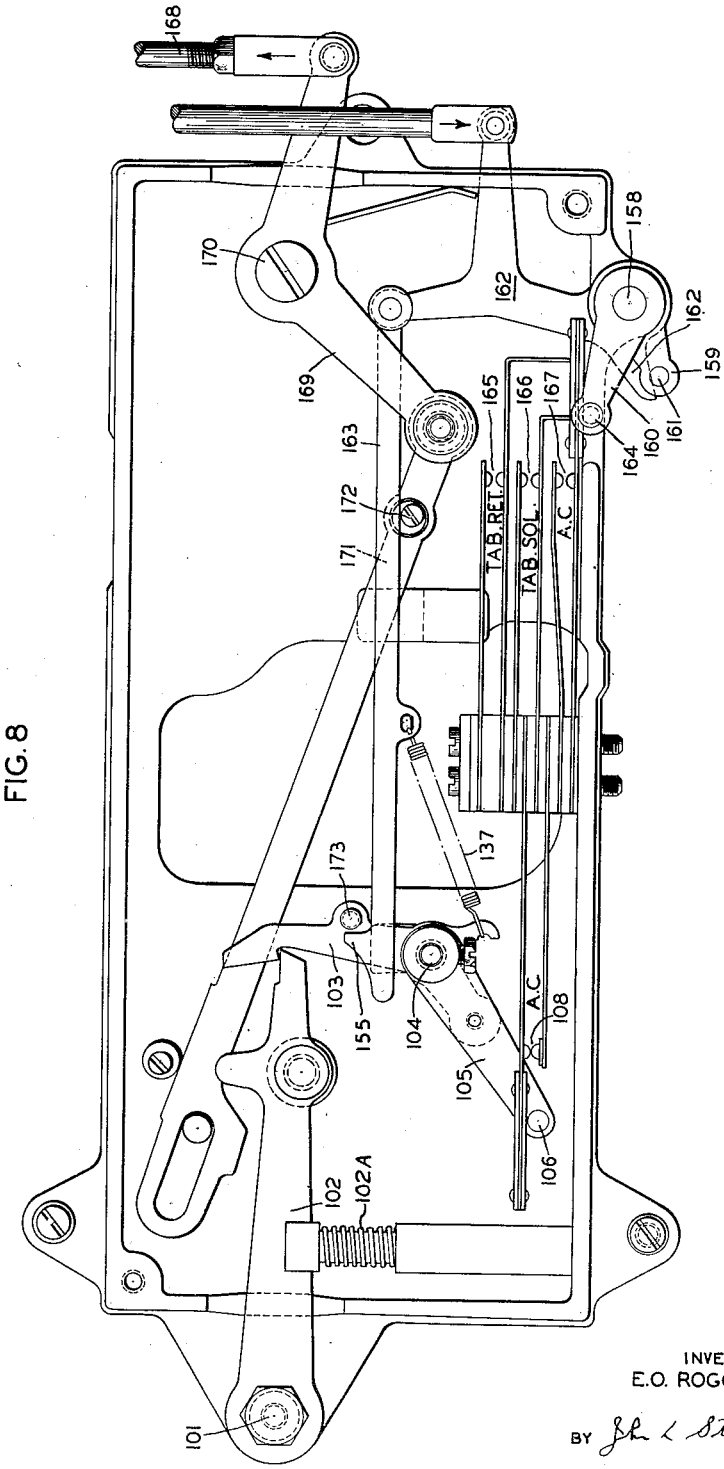

Dec. 12, 1944.　　　　E. O. ROGGENSTEIN　　　　2,364,759
RECORDING AND COMPUTING MACHINE
Filed Oct. 18, 1941　　　　20 Sheets-Sheet 9
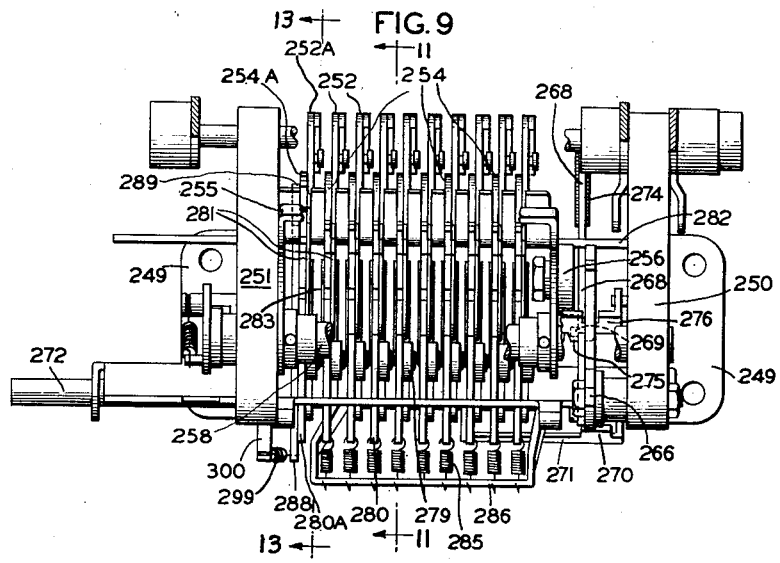
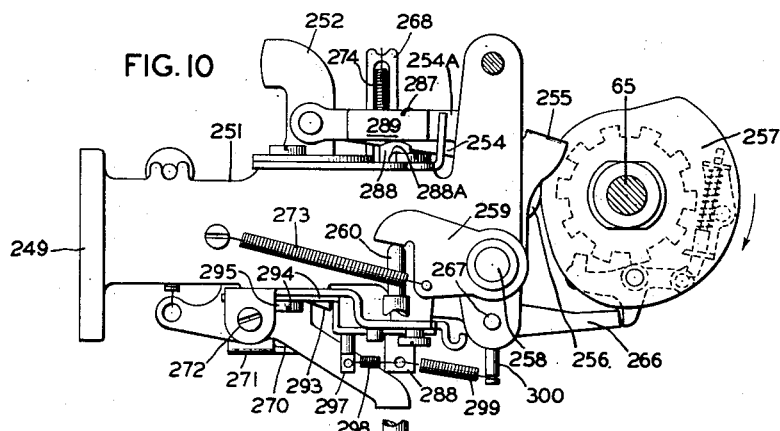
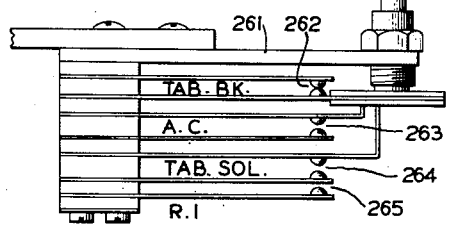
INVENTOR
E. O. ROGGENSTEIN
BY John L. Sterling
ATTORNEY

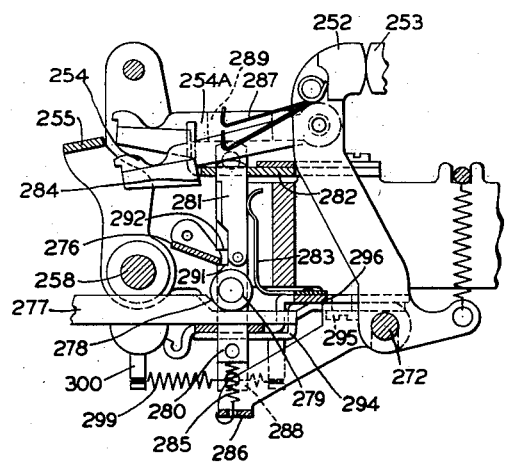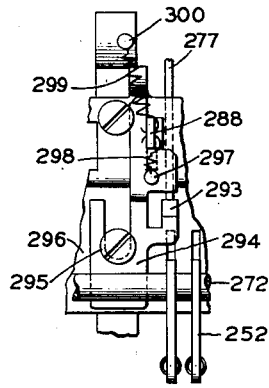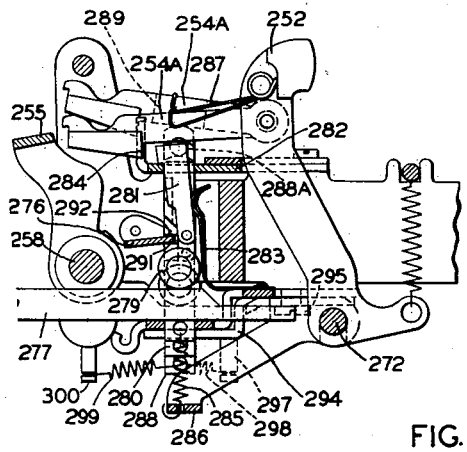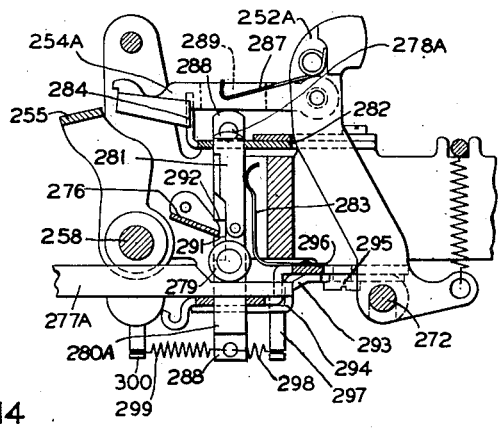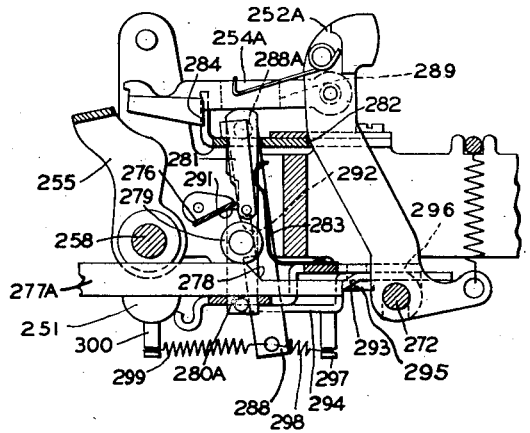

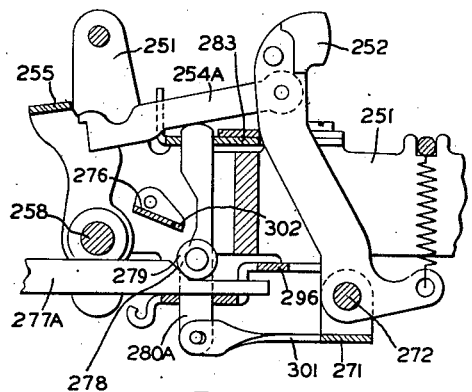
FIG.16
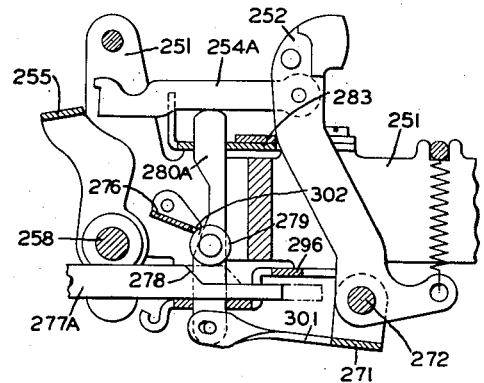
FIG.17
FIG.18
FIG.19
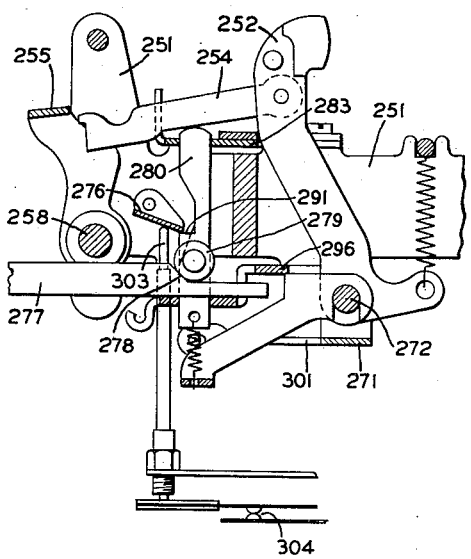
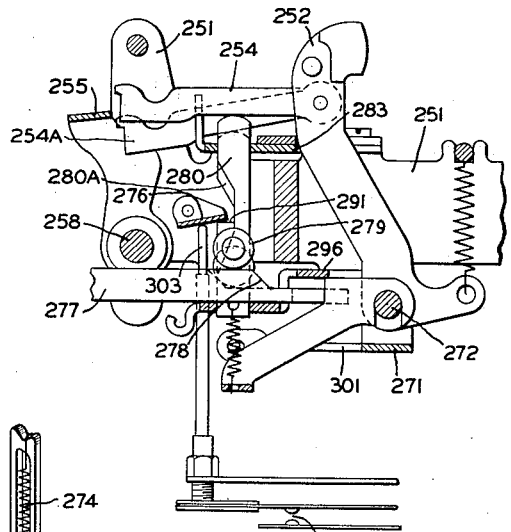
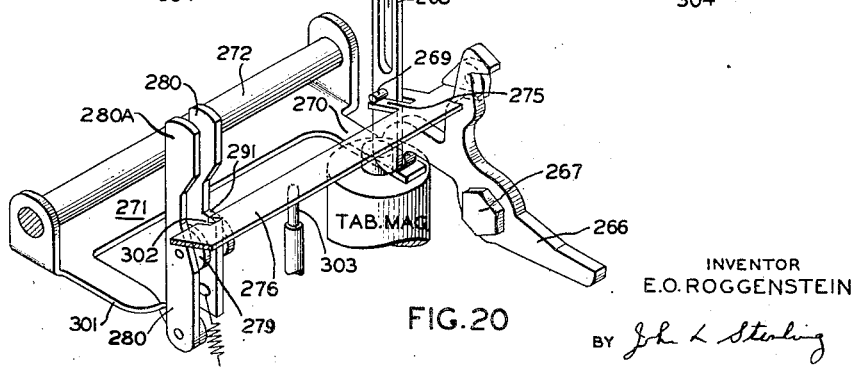
FIG.20
INVENTOR
E.O.ROGGENSTEIN
BY John L. Sterling
ATTORNEY Dec. 12, 1944.   E. O. ROGGENSTEIN   2,364,759
RECORDING AND COMPUTING MACHINE
Filed Oct. 18, 1941    20 Sheets-Sheet 12

INVENTOR
E.O. ROGGENSTEIN
BY John L. Sterling
ATTORNEY

Dec. 12, 1944.  E. O. ROGGENSTEIN  2,364,759
RECORDING AND COMPUTING MACHINE
Filed Oct. 18, 1941  20 Sheets-Sheet 13

INVENTOR
E. O. ROGGENSTEIN
BY John L. Sterling
ATTORNEY

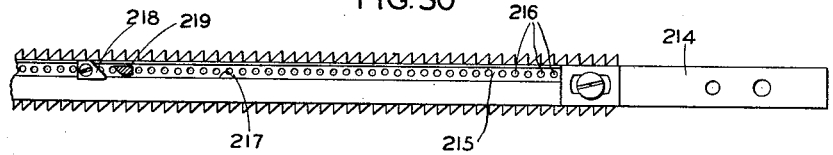
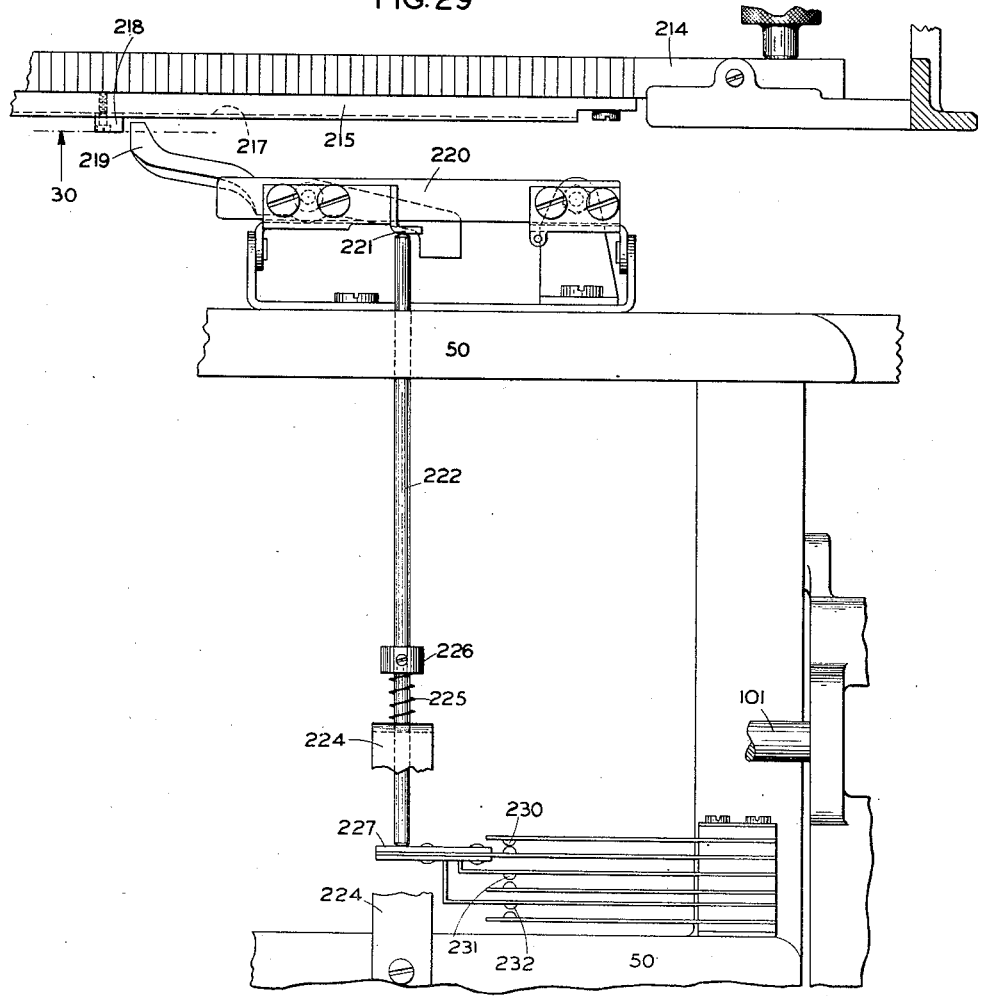

Dec. 12, 1944.   E. O. ROGGENSTEIN   2,364,759
RECORDING AND COMPUTING MACHINE
Filed Oct. 18, 1941   20 Sheets-Sheet 15
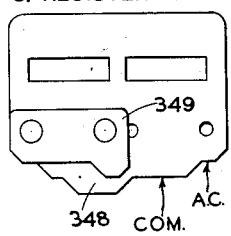
F.C. REGISTER CAM
FIG. 31
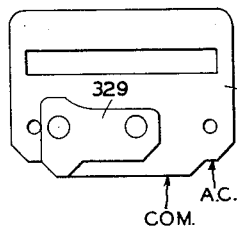
INJECTOR
FIG. 32
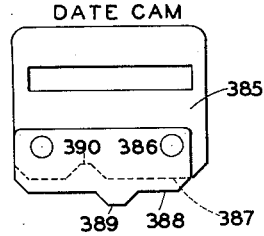
DATE CAM
FIG. 33
SYMBOL & CHECK – NUMBERING
FIG. 34
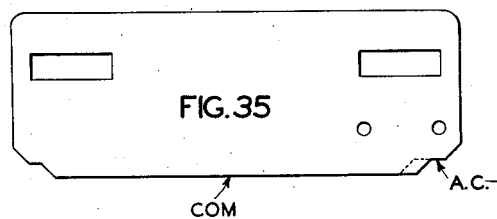
LEFT TOTAL
FIG. 35
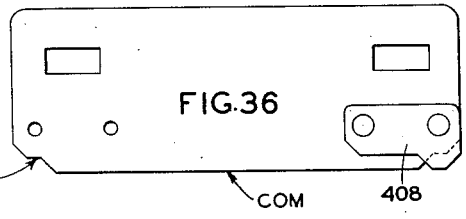
RIGHT TOTAL
FIG. 36
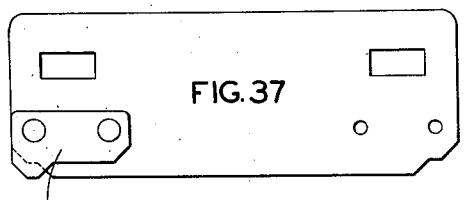
LEFT TOTAL SYMBOL
FIG. 37
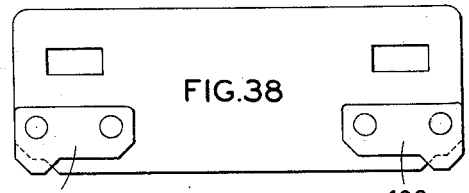
RIGHT TOTAL SYMBOL
FIG. 38
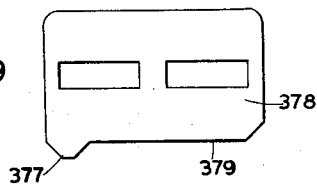
AUTO PROOF LEFT REGISTER
FIG. 39
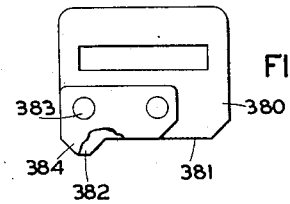
AUTO PROOF RIGHT REGISTER
FIG. 40
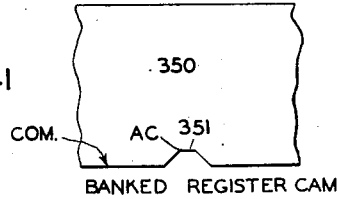
FIG. 41
BANKED REGISTER CAM
INVENTOR
E.O. ROGGENSTEIN
BY John L. Sterling
ATTORNEY Dec. 12, 1944.  E. O. ROGGENSTEIN  2,364,759
RECORDING AND COMPUTING MACHINE
Filed Oct. 18, 1941  20 Sheets-Sheet 16

INVENTOR
E. O. ROGGENSTEIN
BY John L. Sterling
ATTORNEY

Dec. 12, 1944.　　　E. O. ROGGENSTEIN　　　2,364,759
RECORDING AND COMPUTING MACHINE
Filed Oct. 18, 1941　　　20 Sheets-Sheet 17

INVENTOR
E. O. ROGGENSTEIN
BY John L. Sterling
ATTORNEY

Dec. 12, 1944.     E. O. ROGGENSTEIN     2,364,759
RECORDING AND COMPUTING MACHINE
Filed Oct. 18, 1941     20 Sheets-Sheet 18

INVENTOR
E.O. ROGGENSTEIN
BY John L. Sterling
ATTORNEY

Dec. 12, 1944.  E. O. ROGGENSTEIN  2,364,759
RECORDING AND COMPUTING MACHINE
Filed Oct. 18, 1941  20 Sheets-Sheet 19

INVENTOR
E.O. ROGGENSTEIN
BY John L. Sterling
ATTORNEY

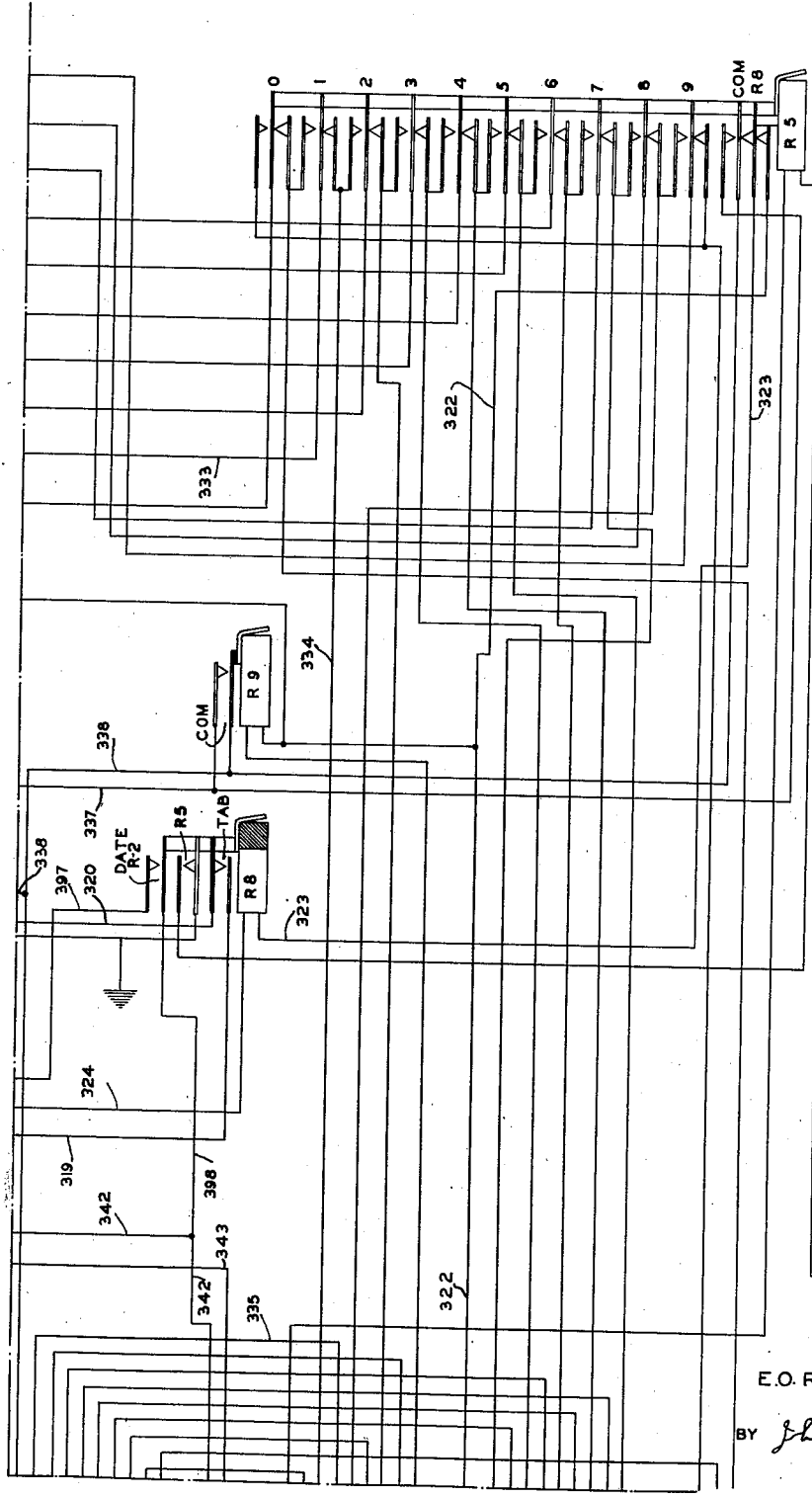

Patented Dec. 12, 1944

2,364,759

UNITED STATES PATENT OFFICE 2,364,759

RECORDING AND COMPUTING MACHINE

Edwin O. Roggenstein, Utica, N. Y., assignor to Remington Rand Inc., Buffalo, N. Y., a corporation of Delaware Application October 18, 1941, Serial No. 415,564

34 Claims. (Cl. 197—176)

This invention relates to new and useful improvements in recording and computing machines and is particularly presented as an improvement over the machines shown and described in my copending applications S. N. 369,399, filed December 10, 1940, and entitled "Recording and computing machines," and S. N. 236,854, filed October 25, 1938, and entitled "Recording and computing machines."

One of the objects of the invention is to simplify the operation and structure of the automatic and decimal tabulating units, to eliminate the use of variable length automatic cam blocks on the rack bar, to improve the action of the tabulator keys so that they do not have to be held down while tabulating, and to insure that the carriage has come to rest before the tabulating mechanism is restored to a normal position of rest.

Another object is to provide simple mechanism whereby the machine can be spaced without tabulation when totalizers are disposed closely adjacent each other.

A further object is to provide simple means whereby the machine will automatically lock when ready automatically to print a negative balance and can only print such a balance after the operator has pressed a button.

A still further object is to provide simple means whereby the carriage can be skipped to a selected distribution column for automatic printing and will not print there until a button is pressed.

Yet a further object is to provide automatic date printing apparatus which will cause the date to be printed in any column without repetition in that column and will then automatically space to the next position.

A further object is to provide means whereby the carriage can be automatically returned to an intermediate position and tabulated automatically from that point to a desired column.

A further object is to provide an improved mechanism whereby in any column a check number may be printed and a number one added to the appropriate register for consecutive check numbering.

A still further object is to automatically obtain a clear symbol from either cross register if the same has been manually cleared, lacking which the machine locks.

Another object of the invention is to obtain automatic spacing over comma and decimal positions of any registers, if desired, and double back-spacing over the decimal points by a single key depression.

Yet another object is to improve and simplify the operation of the timing cam when the space, the star, or the triangle magnets are energized.

A main feature of the invention concerns the provision of short lugs on the tabulator rack to depress the usual automatic tabulator rod to close a "flick" switch which energizes a tabulator magnet. This energization releases the tabulator cam which, in turn, closes a holding switch for the tabulator magnet. In this manner the lugs on the tabulator rack can be of definite short length.

A further feature includes a tabulator break switch which is normally closed but which is opened when the carriage comes to the proper column so as to deenergize the tabulator magnet.

A further feature involves a slow release relay associated with the tabulator break switch which relay delays the deenergization of the tabulator magnet so that the carriage can come to rest before the parts of the tabualting mechanism are restored to normal.

Another feature of the invention includes a special cam on the rack bar cooperating with a double wound relay disposed in a circuit parallel to the star and triangle magnet operating circuit, said relay being a slow release relay, and adapted to control certain circuits whereby a star or triangle may be printed and the carriage spaced from one register position to another without tabulation where the registers are placed closely side by side.

A still further feature includes a special solenoid arranged to control a common supply circuit in parallel with a normally closed common circuit controlled by the credit balance relay. When this relay is energized its common supply is opened and the machine will lock up until the common circuit controlled by the special solenoid is closed. This is effected by pressing a button connected to the plunger of said solenoid.

Yet another feature includes another special solenoid arranged to control a common circuit in parallel with the main common control switch on the tabulator head. A special cam with a double width A. C. or power level at the front end is employed. The machine is skipped to a selected distribution column where it stops in the first position of the A. C. level of the cam. When the skip key is released the tabulator switch is released which opens the starting relay (R1) circuit and closes the A. C. circuit. When the slow release starting relay (R1) is deenergized its common contact is closed but, since the machine is still on the A. C. level of the control cam, the main common control switch is open and the machine will not print. However, by closing the special starting solenoid the parallel common is closed and printing begins. As soon as the machine reaches the higher common level of the special cam a starting solenoid rear control switch is opened to deenergize the starting solenoid and restore its contacts to normal.

Still a further feature includes a special date control cam selectively actuating rear control switches to release the date printing cam. This cam mechanism is provided with mechanical means to rock the escapement lever so that as soon as the date is printed the carriage is advanced one space to open the A. C. power contact so that it is impossible to repeat printing of the date.

Another feature has to do with returning the carriage to an intermediate position from which automatic printing can take place and includes a special intermediate stop switch disposed in relation to and operated by the intermediate carriage return mechanism. An A. C. contact on this switch is in series with the regular A. C. switch operated by the carriage return and they are so related in their operation that as soon as the main carriage return switch is closed, as the carriage comes to a stop, the automatic tabulator mechanism is activated to tabulate the machine to the desired printing position, if the carriage return lever is held in depressed position.

A further feature of the invention includes a special control cam on the tabulator rack to operate certain switches to energize the #1 magnet over a circuit normally employed to print a triangle and to open the circuits of all the other printing magnets. This operation is for the purpose of entering a "one" into a register in connection with the numbering of checks.

Still a further feature concerns special cams for either the right or left register to print a triangle or a star when the register has been manually cleared and print an automatic proof symbol. These cams are adapted to operate certain control switches, whereby, in desired columns to which the carriage is tabulated, the operator manually prints a total and if this is correct the register will be cleared and a star or triangle will be manually printed. This involves also modifying certain contacts on the starting relay (R1) and the zero-spaced relay (R2).

Another feature has to do with the operation of the timing magnet which, when energized, releases the timing cam. Heretofore as described in my copending application S. N. 369,399, supra, the timing cam was released by the action of a pull-link operated through the intermediary of the snatch roll pawl. The improved construction includes a switch in circuit with the timing cam. This switch is closed by a universal bail, which is moved by the operation of the sub-levers of the space, star, and triangle keys. Therefore, the cam is now released by the action of the magnet instead of the pull-link.

Yet another feature concerns means for automatic spacing over the decimal position as well as the comma positions of any registers on the vertical truck. It also includes means to double-back-space the carriage over the decimal positions which a single key depression. The decimal skip feature is achieved by supplying only the rectifier with current in these positions and sending an impulse to the space magnet at the same time. This involves the provision of special control switches actuated by a special skip cam on the rack bar, the relation and operation of which will be set forth hereinafter more in detail. Double back-spacing is achieved by first manually releasing the back-space cam for one revolution thereof by means of the back-space key and then causing the back-space magnet to be energized so as to hold the latch back for a second revolution after which the A. C. supply circuit is broken and the parts return to normal position. Certain relay contacts and control switches are involved in this operation, the relation and operation of which will be set forth more in detail hereinafter.

Further detailed features will be apparent from the following description and claims and are all directed to the achievement of a simplified, accurate operation of the related parts which enable a minimum number of magnets, switches, and relays to achieve the maximum of sequential cooperative actions in any desired time relation.

Subject matter shown, described, and claimed herein and relating to tabulating and associated mechanisms has been retained in this application.

Other subject matter shown, described but not claimed herein is now shown, described, and claimed in my co-pending divisional application filed June 8, 1944, S. N. 539,254, as follows: (1) total printing and control mechanism; (2) timing mechanism in power operated typewriters; and (3) automatic carriage-controlled typing mechanism.

A more clear conception of the operation, construction, and further objects of the invention may be had from the following specification when read in conjunction with the accompanying drawings, in which Fig. 1 is a general front to rear vertical sectional view of said machine having the invention embodied therein, the view being on an irregular section with some parts broken away or shown fragmentarily and many parts omitted;

Fig. 2 is a partial front elevation of the machine, showing the vertical totalizers and the sensing unit;

Figs. 3 and 4 taken together represent a substantially complete plan view of the front and rear halves of the power base as seen when the typewriter frame is raised therefrom;

Figs. 5 and 6 taken together represent a substantially complete inverted plan view, respectively, of the front and rear portion of the relay supporting frame disposed against the bottom of the power base shown in Figs. 3 and 4;

Fig. 7 is a partial vertical right-hand sectional view showing the inter-connection between the star, triangle, and space magnets, and the timing cam and timing magnet mechanism;

Fig. 8 is a side elevation of the carriage return control box with the cover removed showing the A. C. carriage return switch and the intermediate stop switch;

Fig. 9 is a front elevation of one form of tabulator unit which may be employed, shown in normal position;

Fig. 10 is a side elevation of the same showing the tabulator holding switch which is operated when the tabulator cam is released;

Fig. 11 is a cross section of a portion of the tabulator unit in normal position when used in a manual operation of the 2—0 tabulator keys and taken on line 11—11 of Fig. 9;

Fig. 12 is similar to 11 with the parts in operated position;

Fig. 13 is a cross section of a portion of the tabulator unit in normal position when used in an automatic tabulating operation and taken on line 13—13 of Fig. 9;

Fig. 14 is similar to Fig. 13 with the parts shown in position when operated by the first decimal key;

Fig. 15 is an inverted plan view of the unit of Fig. 11 showing a special slide plate for displacing a lift bar;

Fig. 16 is a cross section somewhat similar to Fig. 13 of a portion of a modified form of the tabulator unit in normal position when used in an automatic tabulating operation;

Fig. 17 is a similar view with the parts in operated position;

Fig. 18 is a cross section somewhat similar to Fig. 11 of a portion of the modified form of the tabulator unit with the parts in normal position when used in a manual tabulating operation;

Fig. 19 is a similar view with the parts in operated position;

Fig. 20 is an isometric showing of a portion of the modified form of tabulator unit showing the mechanism for releasing the tabulator cam either in automatic tabulation or by manual depression of a tabulator key;

Fig. 29 is a rear elevation of a portion of the machine showing the automatic tabulator flick switch and connections between it and the tabulator rack bar;

Fig. 30 is an inverted plan view of a portion of the tabulator rack bar with the improved automatic tabulator cams thereon;

Fig. 31 is a plan view of an F. C. or decimal space type of register control cam;

Fig. 32 is a plan view of an injector control cam for check numbering;

Fig. 33 is a plan view of a date control cam;

Fig. 34 is a plan view of the upper portion of a symbol and check numbering cam;

Fig. 35 is a plan view of an ordinary left register total cam;

Fig. 36 is a plan view of an ordinary right register total cam;

Fig. 37 is a plan view of an ordinary left register sub-total symbol cam;

Fig. 38 is a plan view of an ordinary right register sub-total symbol cam;

Fig. 39 is a plan view of an automatic proof left register cam;

Fig. 40 is a plan view of an automatic proof right register cam;

Fig. 41 is a plan view of a part of a control cam for banked registers;

Figure 44:
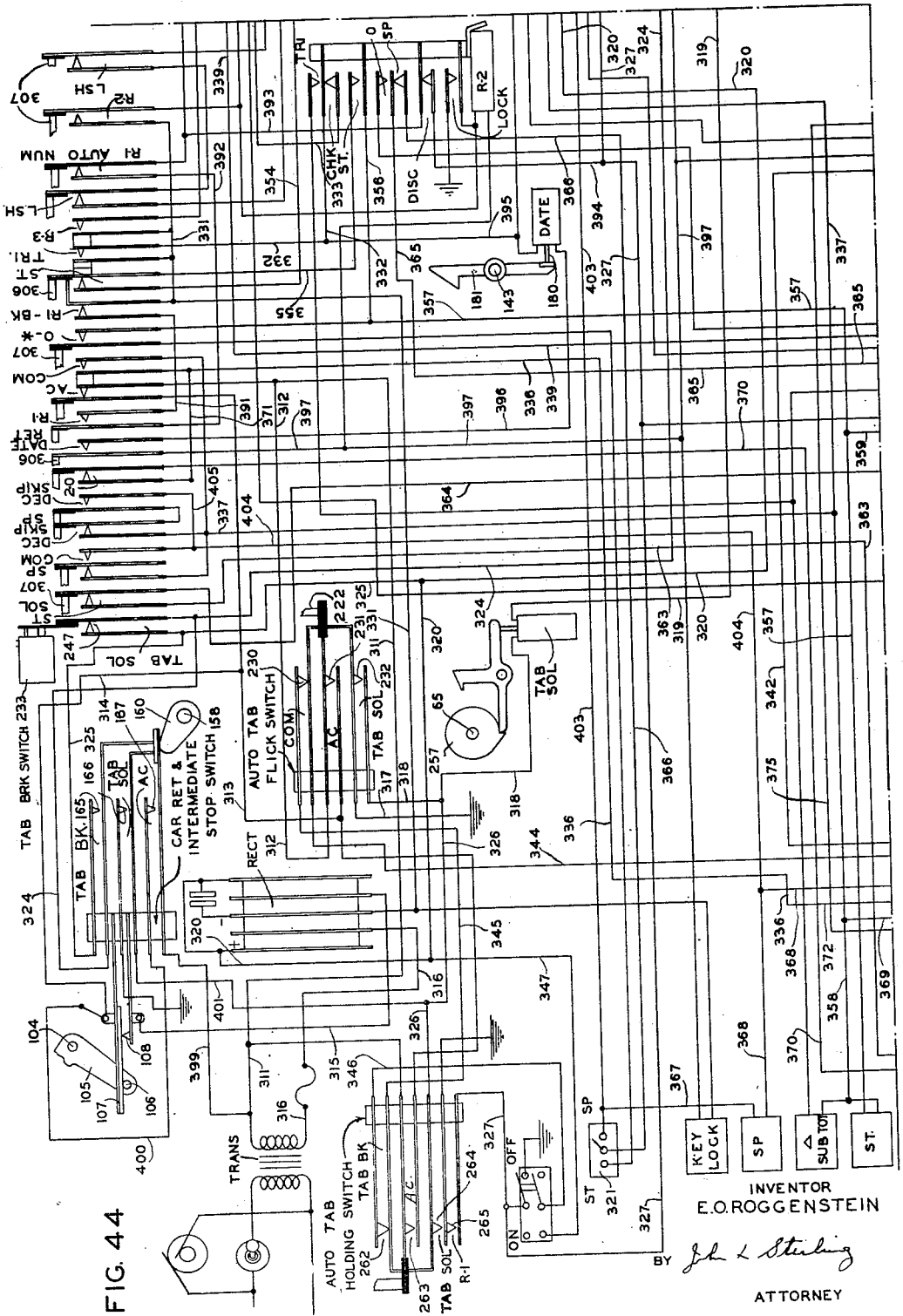
Figure 45:
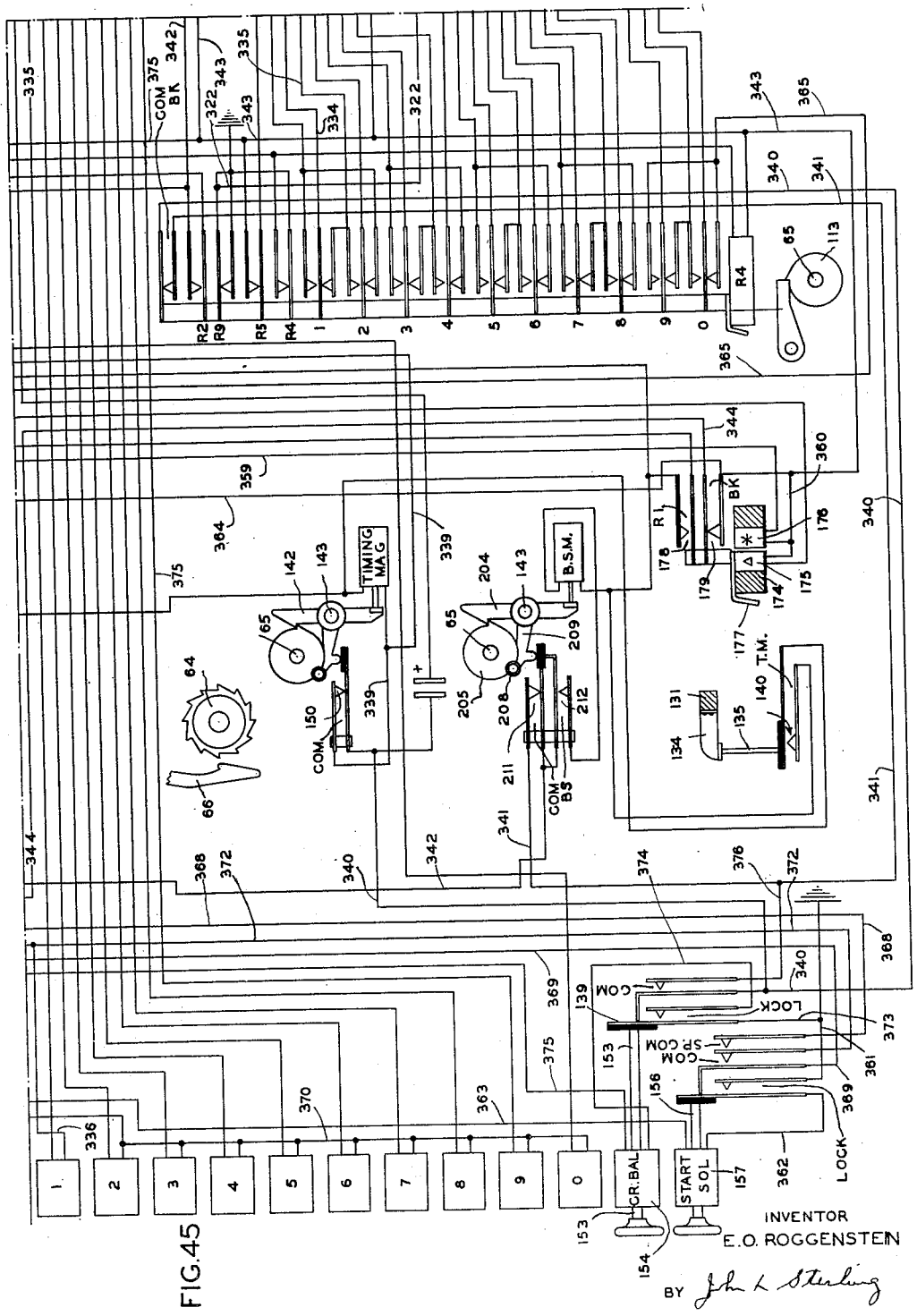
Figure 46:
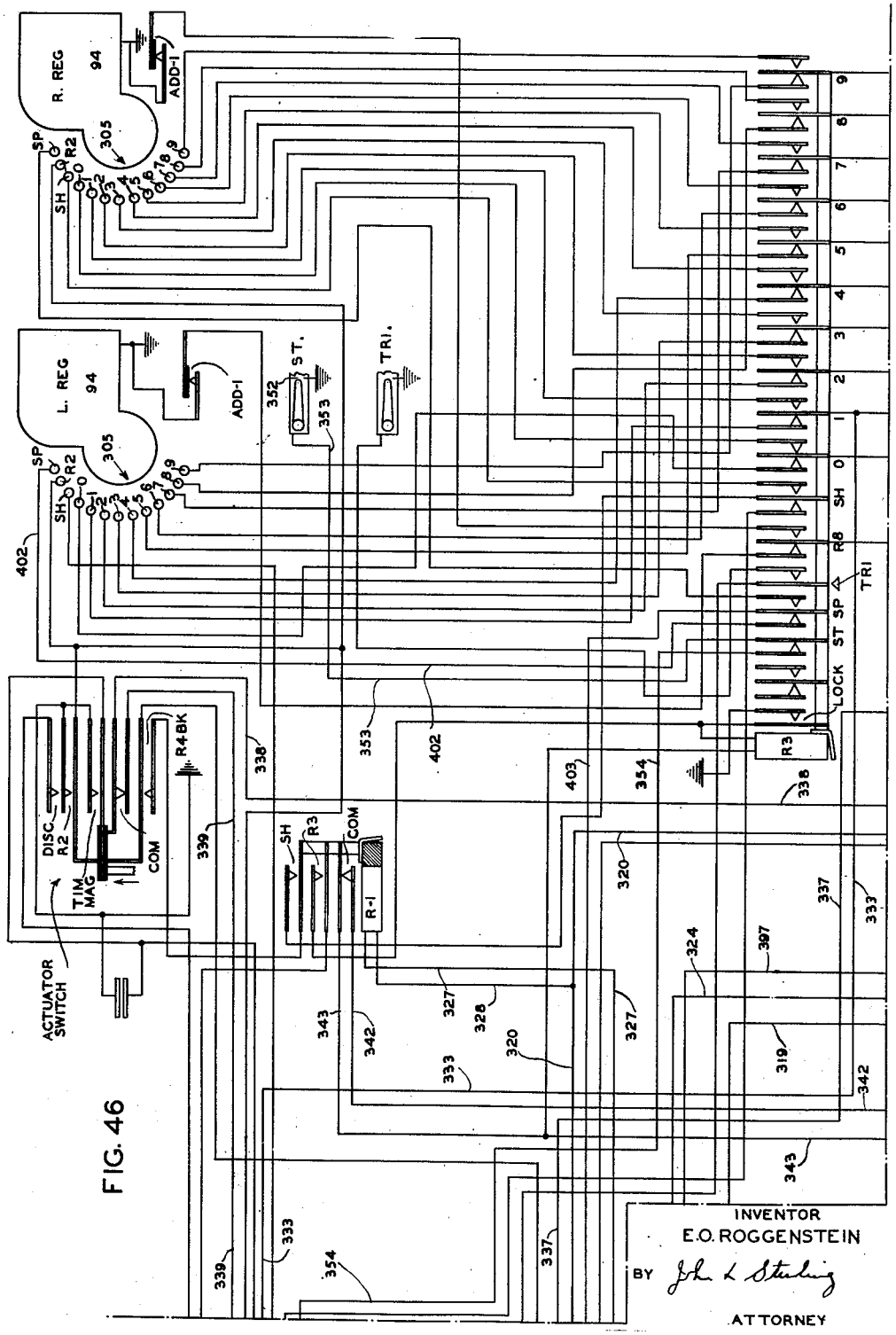

Figs. 44-47, inclusive, show the complete circuits of the machine, and as such Fig. 44 represents the upper left portion; Fig. 45 the lower left portion; Fig. 46 the upper right portion; and Fig. 47 the lower right portion, of said circuit when joined together as shown in Fig. 48, and Fig. 48 is a diagram of the layout of Figs. 44-47, inclusive.

POWER OPERATED GENERAL TYPEWRITER MECHANISM

Figure 1:
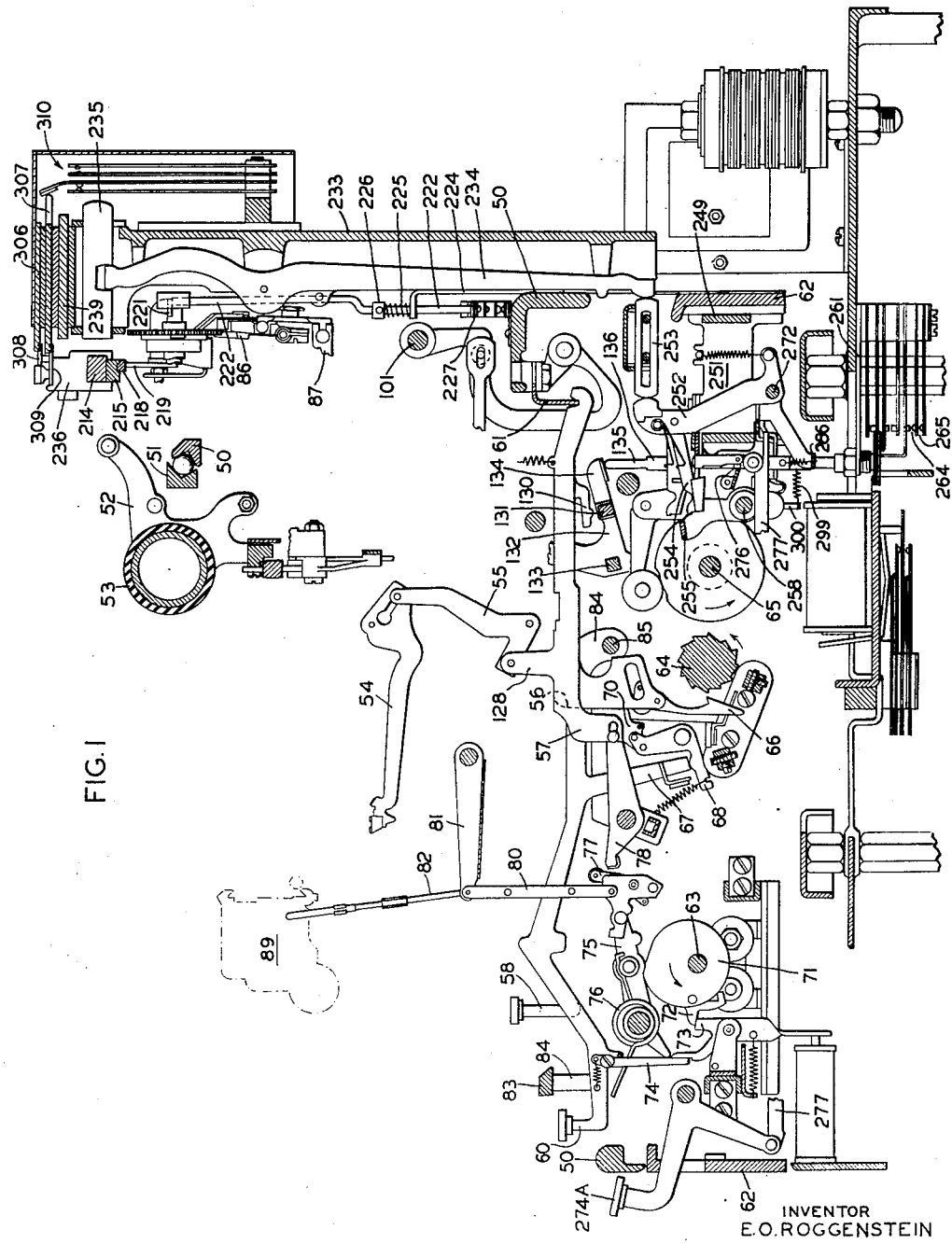

In the drawings the invention is shown applied to an electrified Remington bookkeeping machine. The ordinary Remington electrified bookkeeping machine is well known in the art and has been described in a series of patents, and only so much of the machine is shown in the present drawings as is necessary to an understanding of the invention and its application thereto. Said machine includes a Remington typewriter, fragments of the frame 50 of which are shown in Fig. 1 of the drawings.

The typewriter carriage 51 supports a platen frame 52 carrying a platen 53. The type bars 54 are operated by type bar bell-cranks 55. The bell-cranks which operate alphabetical type bars are operated by levers 56; and those that operate numerical type bars are operated by levers 57, which together with the alphabetical key levers 58 and the numerical key levers 60 are all pivoted on an angle bar 61 at the rear of the machine. All of these type bars are operated by a power drive, located in a base section of the frame 62 on which the typewriter frame is mounted. This power drive includes three continuously rotating shafts, namely, a shaft 63 for operating the computing mechanism and the numerical type bars, a snatch roll 64 for operating the alphabetic and other character type bars, and a rear power shaft 65 which operates the various cams which when released effect such operations as tabulation, case shifting, key-lock, timing, back-spacing and date printing. These three shafts are driven counter-clockwise (see Fig. 1), by any suitable means such as a motor, as shown in the patent to Dodge et al., 2,064,154, issued December 15, 1936.

Each of the alphabetic type bar operating levers 56 has a hook 66 pivoted thereto and hanging down in front of the snatch roll 64. Each of the alphabetic key levers 58 have a dependent arm 67, adapted to rock a bell-crank 68 carrying a hook 70 engaging the upper arm of the hook 66 in such fashion that, when the key lever is depressed, the hook 66 is swung into engagement with the snatch roll, which depresses the lever 56 and operates the type bar.

On the shaft 63 there is a series of cams 71, one for each numeral key. Said cams are loose on the shaft and each is controlled by a clutch, the dog 72 of which is shown in Fig. 1, said dog being adapted for engagement with a toothed wheel 71A (Fig. 3) fast on the shaft. This dog is controlled by a latch 73 adapted to be tripped by a pusher 74, pivoted to the associated key lever 60 with the result that the dog 72 engages the toothed wheel and drives the cam 71 for a single revolution at the end of which it is arrested by the dog 72 again striking the latch 73. Each cam 71 controls a follower lever 75 urged downward by a strong spring 76. The shape of the cam is such that, when it rotates, this lever first moves downward and then up to its normal position. The lever 75 carries a pivoted pawl member 77, which when the lever is at the bottom of its stroke, snaps in under the front end of a lever 78, which at its rear end is articulated by a pin and slot with one of the levers 57. On the upstroke of the lever 75, pawl 77 rocks the lever 78 which, in turn, rocks the lever 57 and operates the numeric type bars 54.

Each lever 75 has pivoted thereto a link 80, which is pivotally connected to a lever 81, which, in turn, has pivoted thereon a pull rod 82, which operates the computing mechanism. All of this mechanism is well known and disclosed and described in the above mentioned Roggenstein application S. N. 236,854.

The Remington machine also includes a space bar 83, whose bail arm 84 (Fig. 1) is mounted on a shaft 85 which is adapted to operate the dog rocker 86 of the typewriter escapement through a link 87 as described in the above application. Further detailed means for operating this dog rocker 86 by energization of the date magnet will be described later. The link 87 is also arranged to be operated in the usual manner by a universal bar which is actuated by the heel of each of the type bars 54 in the well known manner.

The computing mechanism involved herein, except as otherwise described, is of the sort that has long been used in the Remington machine and which is described in a line of patents, which in a way may be said to begin with that to Wahl 1,270,471, dated June 25, 1918. The differential and control mechanism of this computer is mostly mounted on a casting 88 (Fig. 2), which casting is secured to the front top plate of the typewriter. Vertical totalizers or "dummies" 89 may be mounted at desired points on a main truck 90, guided at the middle of the machine by rollers (not shown) and connected with the typewriter carriage 51 by means of a casting 91 having pin and slot connections with brackets 92 at the ends of the truck 90. The machine also includes cross footing mechanism including a cross truck 93 carrying a cross totalizer 94 and controlled by the vertical totalizers 89, one after another through the intermediary of a pick-up beam 95. At the end of each column computation, the cross truck 93 is freed from the vertical totalizer and is drawn back by a spring (not shown) to its initial right-hand position.

Totalizers

The pull rods 82 (Fig. 1) operate the usual mechanism of the type set forth in the Wahl patent supra and in application S. N. 369,399, supra, in which latter see Figs. 35 and 36. The effect of this mechanism is to add to or subtract items from the vertical totalizers 89 and these operations are transmitted to the cross totalizers 94. The vertical totalizers may be reversed for subtraction by means of the usual hand lever (not shown). The cross totalizers may be reversed for subtraction by the usual means including a follower roller 96 (Fig. 2) mounted on an arm 97 fast on a rock shaft 98 and operating the usual reversing mechanism. The follower roller 96 is under the control of cams 99, on each of the vertical totalizers 89, and each cam is settable to an upper position where it does not depress the roller but leaves the cross totalizer mechanism set for addition, as in the left-hand one of the four totalizers shown in Fig. 2; or to an intermediate position as in the third totalizer from the left, where the cross totalizer is disconnected, leaving it inoperative; or to a lowest position shown on the second and fourth totalizers where the roller 96 is depressed to its fullest extent and sets the cross totalizer for subtraction.

Carriage return

The typewriting machine includes a power driven carriage return mechanism. The return of the carriage is controlled by means of the type shown in Hart Patent 1,567,590, issued December 29, 1925, and in this control mechanism there is a rock shaft 101 which at its left end (Fig. 8) is controlled through an arm 102 by mechanism which is well known and will be described in more detail later. Suffice it to say that at the end of a line of writing, the arm 102 is released and moved upward by a spring 102A causing rocking of shaft 101 which results in the engagement of certain power mechanism with the carriage 51 to return the same as described in the above mentioned patent. This mechanism is not further described in detail here but the arm 102 is released by a latch 103 the operation of which will later be described. The latch 103 is fixed to a shaft 104 to which is also fixed an arm 105 having a stud 106 thereon lying just beneath the end of a contact 108 which is in the electrical circuit of the machine as will be described later. This circuit is the power circuit for all the magnets and relays of the machine, the opening of which by the rocking of shaft 101 prevents their operation during carriage return.

Power operated shift and reverse mechanism

Figure 4:
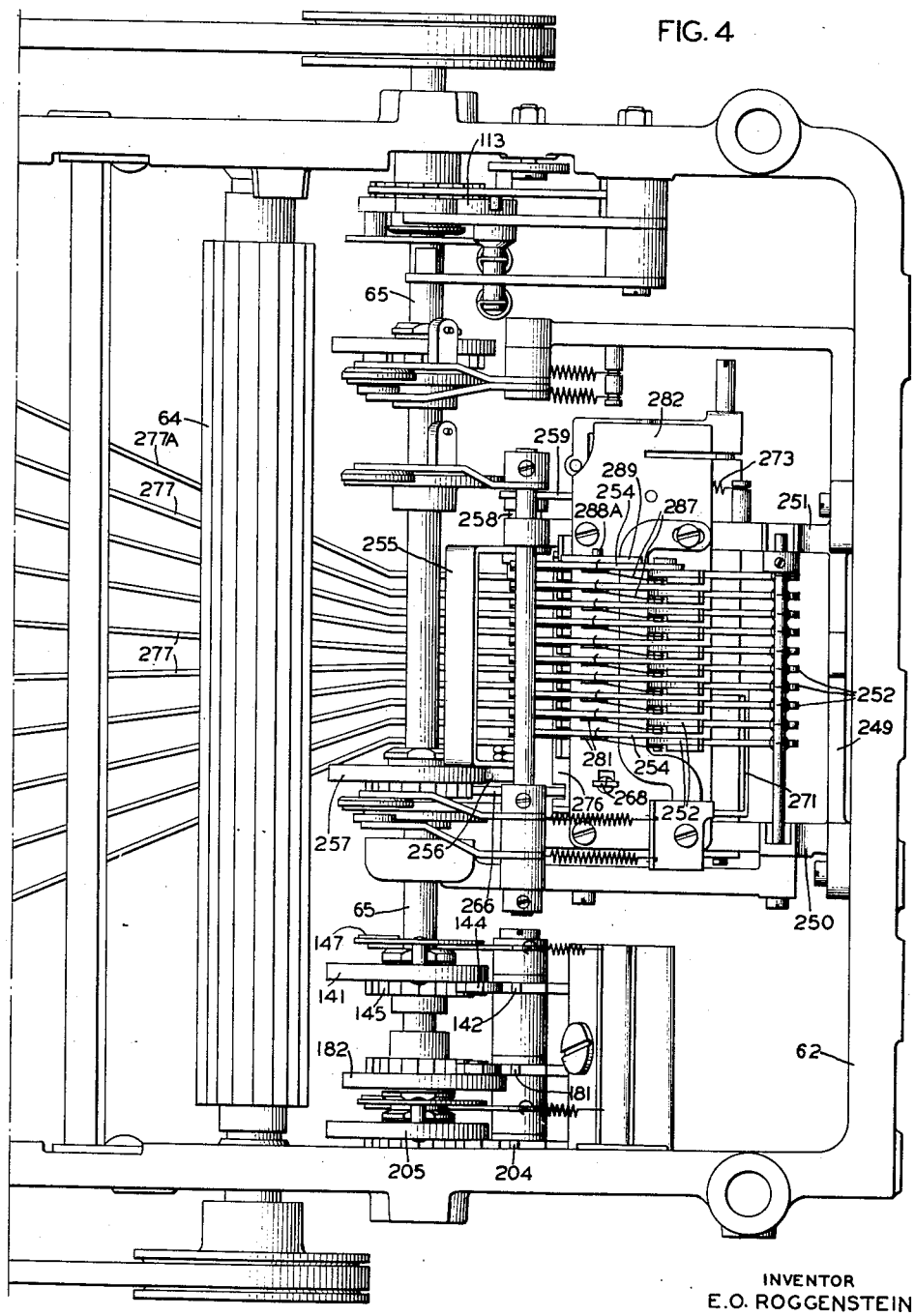

In the manner described in detail in my application S. N. 369,399, supra, the type case can be shifted and the totalizers reversed by the operation of the credit balance key 110 and the shift key 111 (Fig. 2) which operation results in the upward movement of a rod 112 to achieve the reverse of the computing mechanism. The shift is effected by the depression of key 111 to manually trip the latch on the shift cam 113 (Fig. 4) or this cam can be released by energization of the shift magnet R4 in the manner set forth in the application, supra. As in the previous application the case is shifted to print negative totals in distinctive type. The shift lock key 114 is of the same construction as heretofore used in the Remington machine and is described in detail in the above application S. N. 369,399.

Space, star, and triangle magnets and timing switch

In Fig. 7, is shown a mechanism whereby the escapement is operated whenever the space mechanism is actuated either manually or automatically and whereby the timing contact is actuated whenever either the space, star, or triangle magnets are energized. In this figure the space lever 84, operated by the space bar 83, is pivoted loosely on shaft 85 and has a pin or stud 115 adapted to act in a slot 116 in an arm 117 fixed on a sleeve 118 which is rotatable on shaft 85. An arm 119 is fixed to sleeve 118 and has a pin 120 adapted to ride in a fork on a pivoted arm 121 which is connected in any suitable manner to link 87 (Fig. 1) which is connected to the escapement rocker element 86. When lever 84 is operated by depression of the space bar 83, the arm 119 is rocked to effect operation of the escapement rocker.

Figure 3:
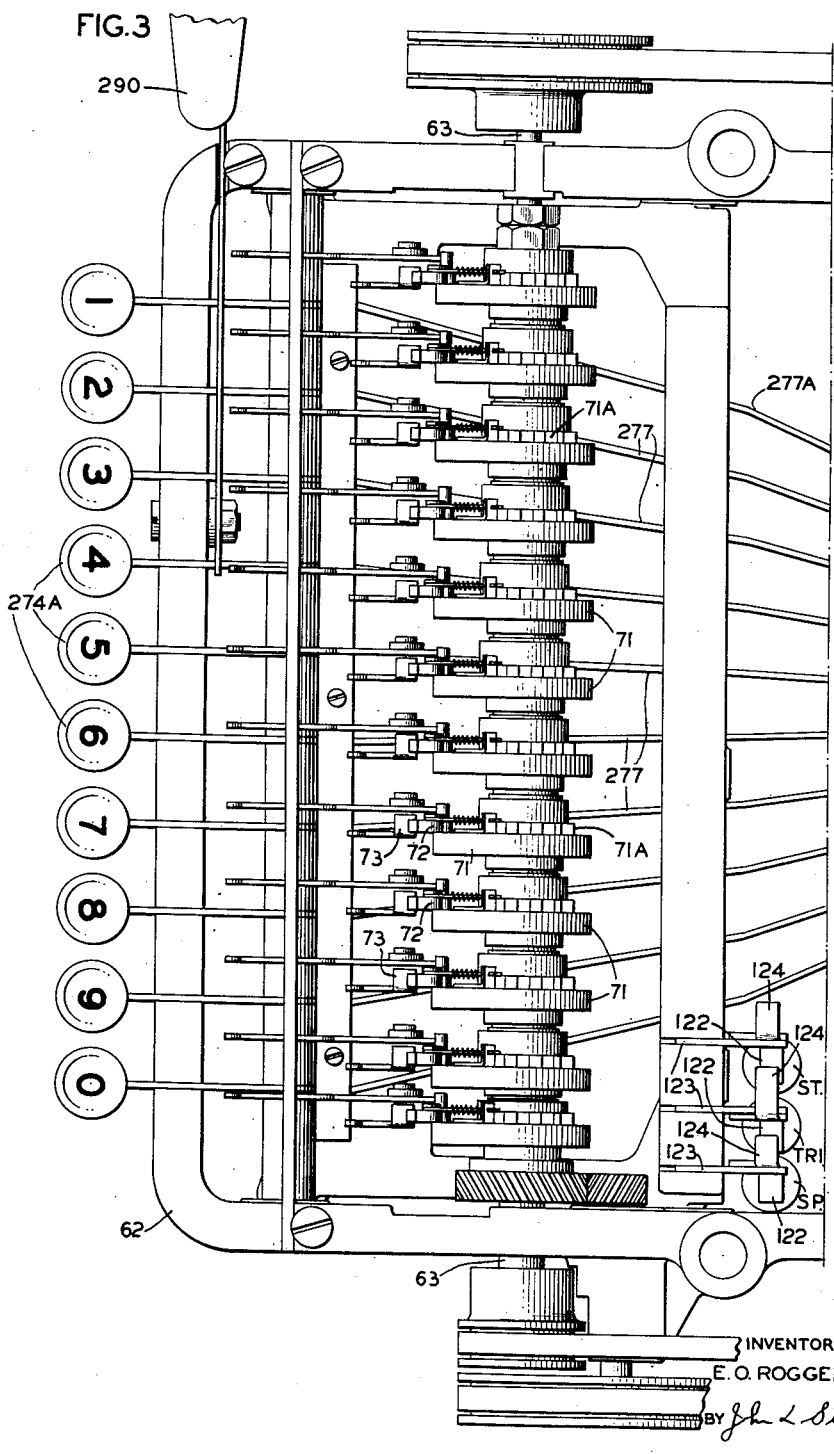
Figure 5:
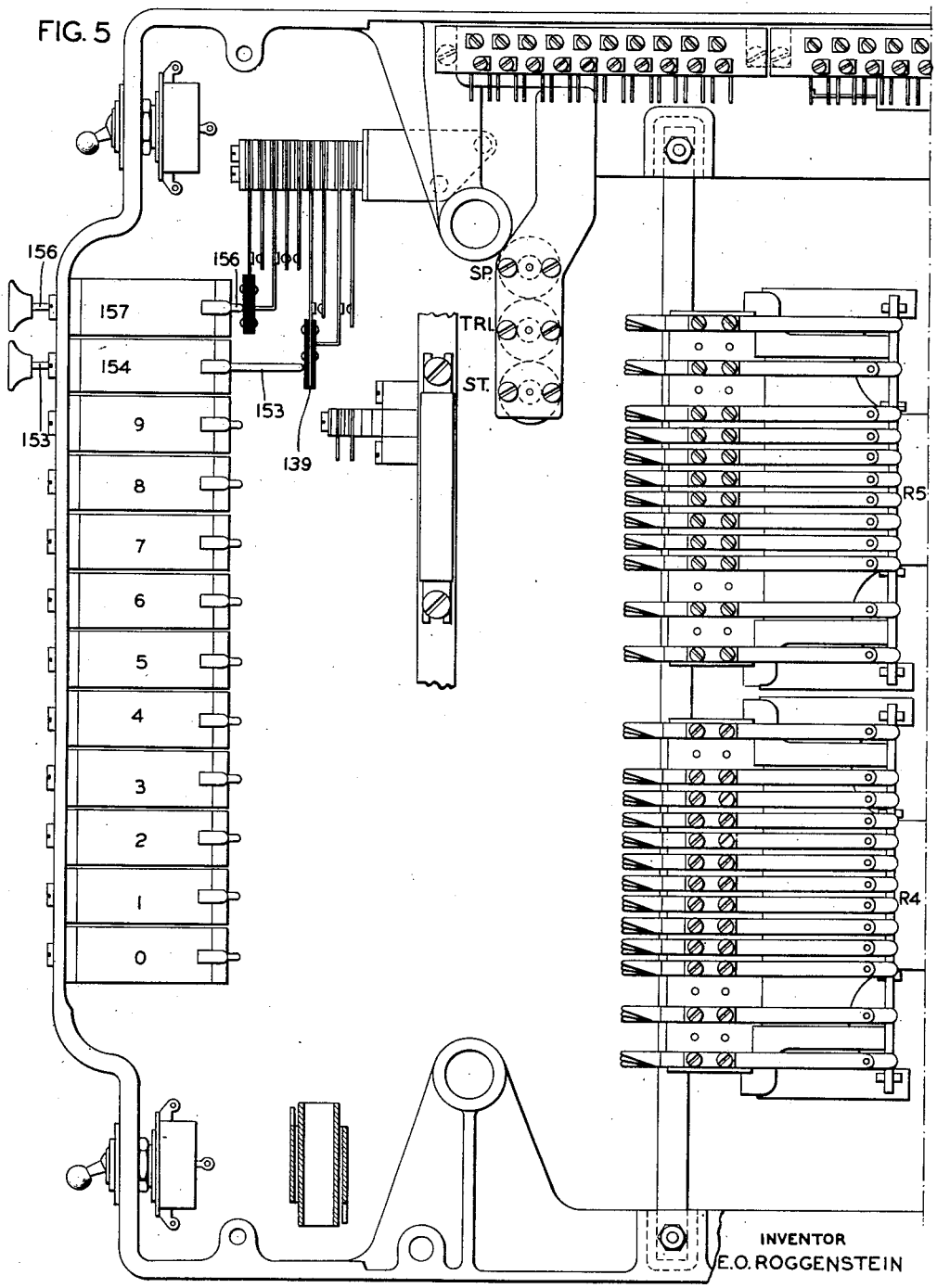

There are three magnets such as the star, triangle, and space magnets shown in Figs. 3, 5, and 7, and lettered respectively, ST., TRI., and SP. In Fig. 7, the view is taken in a plane to show the space magnet SP. and its cooperating mechanism, but it is to be understood that the triangle and star magnets are disposed adjacent thereto and have similar cooperating members, except in minor details, which will be hereinafter explained. The space magnet SP. when energized is adapted to thrust upward on a lip 122 of an adjustable interponent 123 which has another lip 124 adapted to engage and rock a bell-crank 125 loosely pivoted on a shaft 126 in a clockwise direction. The other arm of bell-crank 125 is connected by a link 127 to a bell-crank 68A which in operation is identical with previously described bell-crank 68 and is adapted to swing a hook 66A into contact with the snatch roll 64 whereby the space operating lever 56 is depressed in the usual manner. The lever 56 is provided with an upstanding lug 128 having a roller 129 thereon, adapted to engage the upper end of arm 117 so that when the lever 56 is depressed this arm 117 is swung counterclockwise to actuate arm 119 to operate the escapement mechanism. When the triangle and star magnets TRI. and ST. are energized the same operation takes place except that the levers 56 connected therewith have no rollers 129 but their upstanding lugs 128 are connected to links 55 and type bars 54 which when operated effect the operation of the escapement through their heels in the usual manner.

Figure 6:
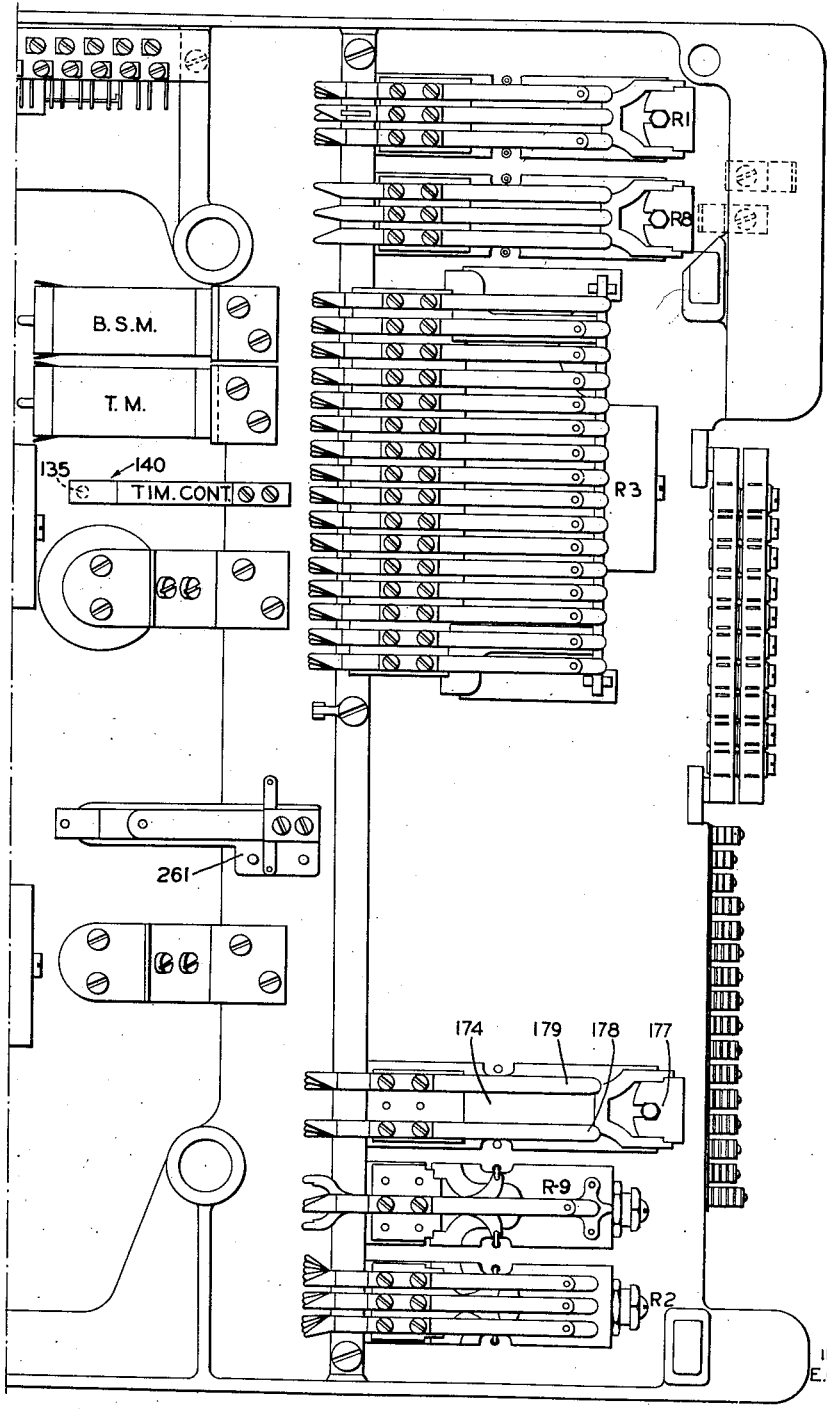

In accordance with one feature of my invention, I provide means whereby the depression of any of the levers 56 by the energization of the above three magnets will result in the energization of the timing magnet, T. M., and consequently the actuation of the timing switch. To this end these levers 56 are each provided with a dependent member 130, which will engage a bail 131 supported between arms 132 (one shown, Fig. 7) secured on a shaft 133. To this bail 131 is attached an arm 134 which overlies a plunger rod 135 housed in a long sleeve 136 supported at its lower end in a casting 137 which is mounted on a supporting plate 138. The lower end of rod 135 engages a normally open contact 140 and when the plunger 135 is moved down the contact 140 is closed. The contact 140 is suitably supported on the base plate of the machine as shown in Fig. 6. This contact is in circuit with the timing magnet T. M. and when closed by depression of rod 135 will energize said magnet. The circuit connections will later be described. The timing magnet is adapted to operate a latch 142 pivoted at 143. This latch is adapted to engage a dog 144 related in the manner previously described to a clutch wheel 145 on shaft 65, said dog being mounted on a plate 141. A roller 146 adapted to cooperate with cam 147 is mounted on an arm 148 loosely pivoted on shaft 143. An extrusion 149 on arm 148 is adapted to open a normally closed contact 150 when the timing cam 147 lowers the arm 148. The cam latch 142 is released by energization of the timing magnet T. M., the core of which thrusts outwardly against the lower end of the latch 142.

It is, therefore, apparent that the energization of any one of these three magnets above mentioned will cause the operation of the timing cam to open the timing contact 150, upon the printing of the star and triangle, and the spacing of the machine. This mechanism also permits the manual operation of the space bar in the usual manner. It is also apparent that the operation of the timing cam will hold the timing contact 150 open during a full revolution of the cam and thus keep the circuit open until the moving parts of the machine during any operation have plenty of time to come to rest.

Actuator switch

In Fig. 46, which is on one of the circuit sheets, is shown an actuator switch which is fully and clearly described in my application S. N. 369,399 with especial reference to Figs. 35, 36, and 37 thereof. It is a switch which is operated by the movement of the actuator whenever any significant digit is printed and controls the opening and closing of certain circuits as will be later described in connection with the description of the circuit operation.

Credit balance switch

In Figs. 5 and 45 is shown a credit balance switch 139 and solenoid 154. This switch is actuated by pressing the plungers 153 of solenoid 154. As shown in Fig. 45 when the plunger 153 is pressed the inner end actuates certain contacts on switch 139 to close certain circuits as will be later described. This switch is employed in connection with a feature of the invention later described having to do with the automatic stoppage of the machine when it is tabulated to a total printing column and a negative balance is to be printed. When this switch is actuated printing is resumed and the switch is locked up until later released.

Starting solenoid

When tabulating to certain selected distribution columns by means of the usual skip tabulator key, a special control cam is used, as will later be described, to cause the machine to stop when this column is reached and not to print until the starting button is pressed. This device is also shown in Figs. 5 and 45 and is similar to the above described credit balance switch. The plunger 156 is the core of a solenoid 157. It is locked up when actuated and later unlocked and actuates certain contacts as will be later described.

Intermediate stop switch

This switch is shown in Figs. 8 and 44 and has to do with the control of the circuit operations during carriage return to an intermediate position and tabulation from that position automatically to a selected column. It is especially useful when it is desired not to return the carriage to its full extent but to start automatic printing again at an intermediate column. The mechanical structure and operation of this switch will now be described leaving its operation in controlling the electrical circuits to be described in connection with the general circuit description and operation. The intermediate stop and carriage return mechanism employed is of the type and structure shown in U. S. Patent to W. L. Peters, No. 2,023,543, issued December 10, 1935. The improvement herein involved concerns the relative sequential operation of two switches by this mechanism to automatically tabulate to a designated column after the carriage has reached the intermediate stop position.

When returning the carriage to the intermediate stop, which has been set in the desired position, the operator releases the carriage return mechanism by means of depressing the carriage return lever (not shown) at the right-hand side of the machine, which is adapted to rotate shaft 158 to which is fastened a small assembly consisting of two arms 159 and 160. A pin 161 on arm 159 rotates bell-crank 162 clockwise pulling link 163 to pull back latch 103 by means of hook 155, thus opening the master control A. C. switch contact 108 (by means of arm 105 and pin 106) before pin 164 on arm 160 closes the intermediate switch which has contacts 165, 166, and 167. According to the circuit, the contact 108 is in series with the contact 167 whereby, as later described, no current can be supplied to the rectifier until both these contacts are closed.

When the carriage hits the intermediate stop element (not shown) restore rod 168 is pulled in the direction indicated by the arrow, rotating bell-crank 169 pivoted on stud 170. A link 171 connected to bell-crank 169 is pulled down so that link 163 resting on an adjustable stud 172, on link 171, will be drawn down by spring 137, lowering hook 155 away from pin 173 on latch 103, allowing the latch to snap back to normal and lower pin 106, thus permitting A. C. contact 108 to close.

*Special double coil relay*

This is illustrated in Figs. 6 and 45 in which latter it is shown somewhat schematically. This relay is in circuit, in a manner to be later explained, in detail, with the star and triangle symbol magnets and is employed for the purpose of not only printing symbols and balances but also to space between registers which are banked closely adjacent each other. As shown, the relay 174 is a special slow release type with two coils 175 and 176, the first associated in circuit with the triangle magnet and the second in circuit with the star magnet. The inner ends of the coils are connected. The relay armature 177 controls a contact 178 which is normally open and a contact 179 which is normally closed.

*Date printing mechanism*

Figure 26:
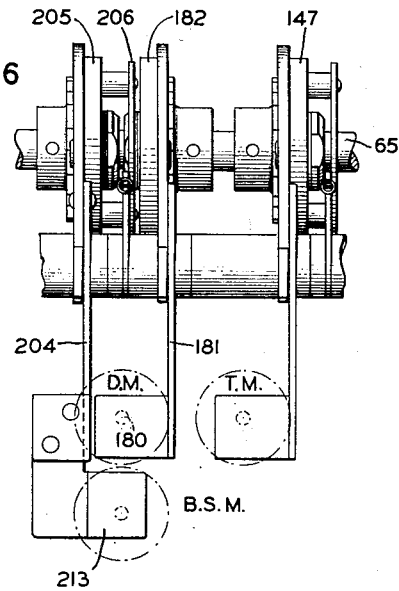
Fig. 26 is a rear elevation of a portion of the power cam shaft showing the date, back-space, and timing cams and the connections between and their respective operating magnets.
Figure 27:
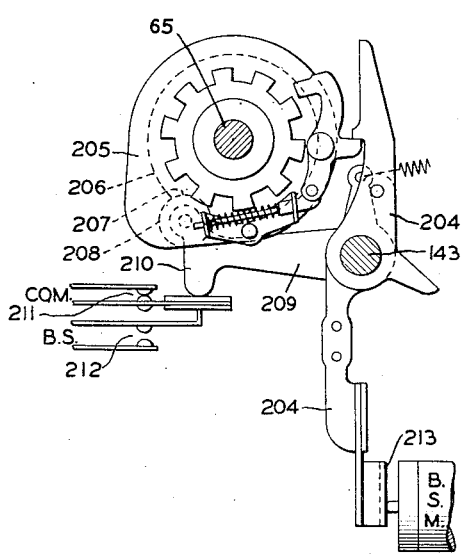
Fig. 27 is a side elevation of said shaft showing the back-space cam and switch and operative them and their respective operating magnets.
Figure 28:
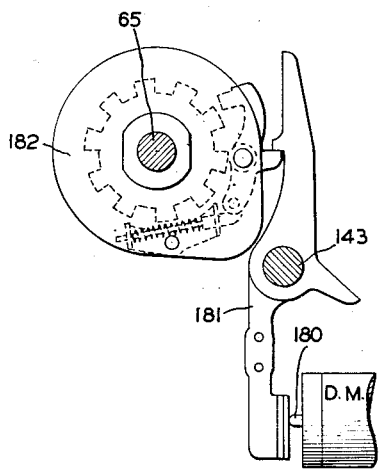
Fig. 28 is a similar view for the date cam and associated magnet.
Figure 42:
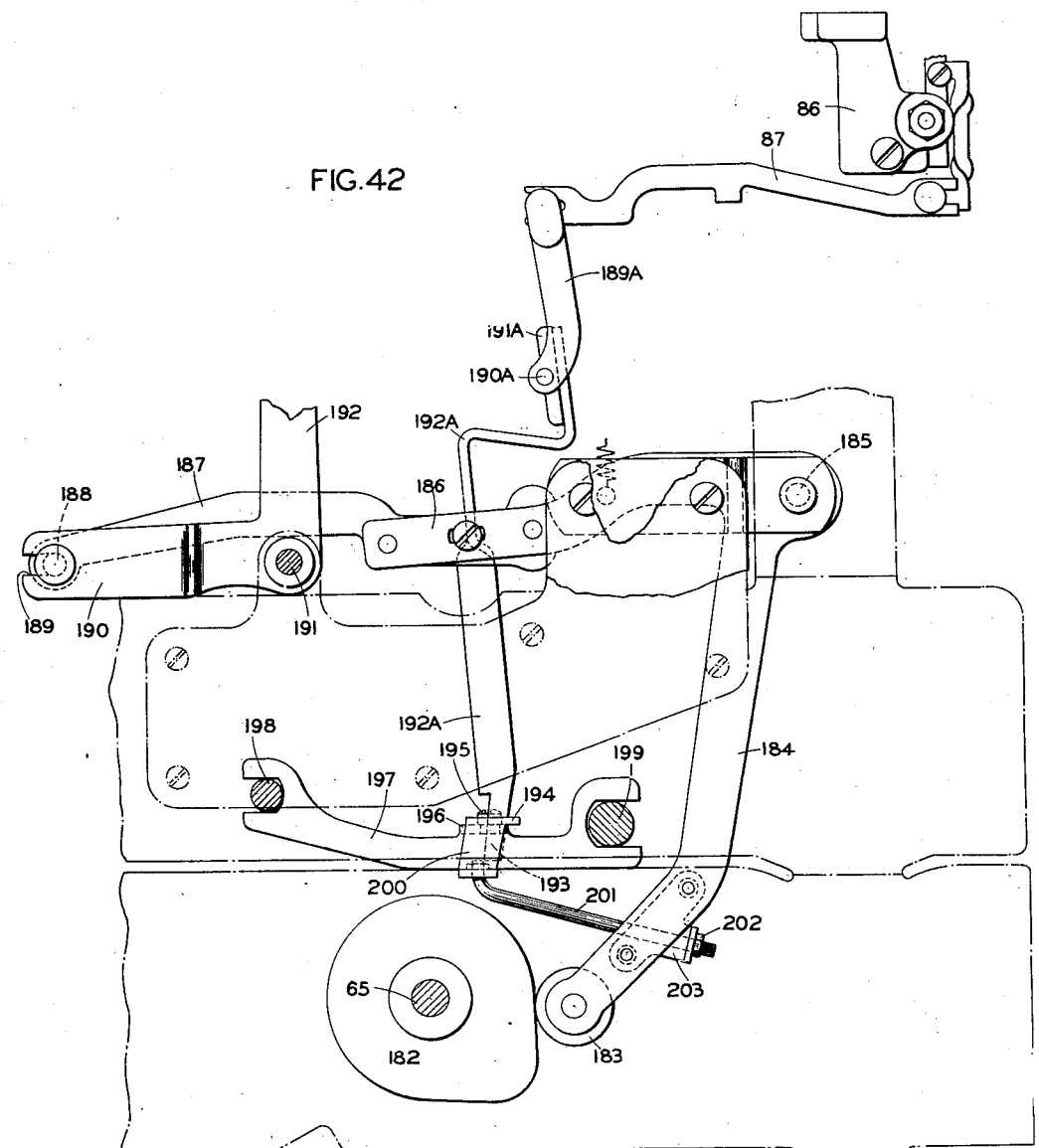
Fig. 42 is a side elevation of a portion of the machine showing the mechanism for operating the date print bar and the carriage escapement.
Figure 43:
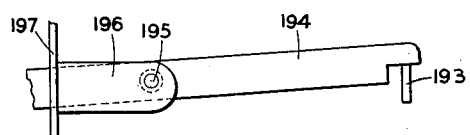
Fig. 43 is an inverted plan view of a portion of the connection between the date cam and the escapement rocker.

This mechanism is shown in Figs. 4, 26, 27, 28, 42, 43, and 44. The actual mechanical construction and operation will be described, leaving its relation to the electrical circuits and the date control cam to be described in the proper portion of the description of the circuit and its operation. The purpose of this mechanism is to enable a date to be printed automatically in any desired column. As seen in Figs. 26 and 28, the date magnet D. M. is supported in any suitable manner immediately above the back space magnet B. S. M. Its armature 180 actuates a latch 181 to release the date cam 182. In its general aspect the construction is similar to that shown in a U. S. patent to Hart No. 1,952,983, issued March 27, 1934. Certain changes have been made which when combined with circuit operation and control, constitute a feature of this invention. As shown in Fig. 42 as the cam 182 is released to rotate it engages a roller 183 on bell-crank 184 pivoted on a stud 185. This bell-crank is connected by its horizontal arm 186 to an extension link 187 having on its outer end a pin 188 disposed in a slot 189 of a bell-crank 190 pivoted at 191, the vertical arm 192 of which is connected, as clearly shown in Fig. 1 of the Hart patent, supra, to the date printing arm to operate the same. Immediately after the date has been printed, it is desired that the carriage be moved one space and to this end I provides means operated by the movement of the date cam 182 so as to rock the escapement, and space the carriage. This means includes the usual escapement rocker element 86 connected to link 87 which in turn is connected to the universal type-bar 189A which rocks around a pivot 190A. To a central plate 191A on the bar 189A is fastened a dependent link 192A, the lower end 193 of which lies closely adjacent the outer end of an oscillatory lever 194. This lever 194 is pivotally mounted at 195 on a plate 196 fastened to a cross bar 197 which is provided with end slots to engage and be supported by cross rods 198 and 199. The other end of lever 194 is bent down as shown at 200 and to the flat end thereof is fastened one end of a tie rod 201, the other end of which is adjustably connected, in any suitable manner such as by an adjusting nut 202, to a bracket plate 203 fastened to the cam operated bell-crank 184 near its lower end adjacent the date cam 182. It is obvious, therefore, that the oscillation of bell-crank 184 by the cam 182 will oscillate lever 194 to rock link 192A and thereby rock the escapement rocker element 86 to space the carriage. The relative mechanical adjustment of the operating parts may be suitably arranged so that the operations of date printing and carriage escapement may take place in the proper time sequence.

*Decimal skip and double back space mechanism*

This mechanism is shown in Figs. 26, 27, and 45. Only the actual mechanical construction and operation will here be described leaving its relation to the electrical circuits and the decimal skip control cam to be later described in the proper portion of the description of the circuit and its operation. The purpose of this mechanism is to enable the carriage to be automatically spaced past the "comma" and "decimal" space positions and to be back-spaced two positions past the decimal point upon the manual depression of the back-space key. As shown in Figs. 26 and 27 the mechanical operation is relatively simple and involves the back-space magnet B. S. M., which, when energized, trips the latch 204 to release the back-space cam 205 and operate the back-space mechanism in the usual manner. A disc 206 moves with the cam 205 and has a notch 207 in which lies a roller 208 on the end of an arm 209 loosely pivoted on the rod 143. The arm 209 has a dependent lug 210 adapted to operate contacts 211 and 212 of a back-space switch of which the first contact is normally closed and the second contact normally open. Since the date magnet and the back-space magnet are superposed it will be seen from Fig. 26 especially that the latches 181 and 204 are in different planes although the magnets themselves are in the same vertical plane. Therefore, the latch 204 has a laterally extended lower ear 213 disposed in front of the back-space magnet to permit the magnet plunger to operate the latch 204.

*Automatic tabulator and flick switch*

In the Dodge and Philbin Patent No. 2,064,154, issued December 15, 1936, there is shown an automatic tabulator in which a cam block on the carriage tabulator rack bar actuates a mechanical linkage to release the tabulator cam. In that construction, however, the block had to be in length equal to the distance the carriage was to be tabulated and, therefore, a large variety of blocks had to be supplied and constant shifting of blocks was necessary. In accordance with the present invention, however, the cam blocks are all of one length and very short, just sufficient to "flick" the mechanical linkage which in this instance is now adapted to operate a switch instead of directly and mechanically releasing the tabulator cam. This flick switch in turn energizes a tabulator magnet to release the tabulator cam. As soon as the tabulator cam is released a tabulator holding switch is closed to control certain circuits including a holding circuit for the tabulator magnet.

The improved automatic tabulator and flick switch is shown in Figs. 1, 29, 30, and 44. As shown the tabulator rack bar 214 has a bar 215 fastened to its bottom edge. This bar 215 has a long row of holes 216 formed therein preferably one-tenth of an inch apart in a slot 217. Tabulator cam blocks 218 (one shown) may be positioned in the slot in line with a desired hole and then held in place by suitable screws. The cams are beveled and adapted to engage the upwardly extending end 219 of an arm fastened to a rock frame 220 as described in the Dodge and Philbin patent, supra. This frame has a lateral ear 221, lying over the upper end of rod 222. This rod passes at its upper end through a hole in the frame plate 50 of the machine as indicated in the above patent and near its lower end passes through a hole in a bent over bracket plate 224 which is screwed at its lower end to the frame 50 (Figs. 1 and 29). A spring 225 is disposed between the top of plate 224 and a block 226 on the rod 222 and tends to push rod 222 upwards. When the rod is depressed it engages a plate 227 of the automatic tabulator "flick" switch which is mounted on top of the lower portion of frame 50. This switch has a plurality of contacts 230, 231, and 232. The first 230 is normally closed and the last two 231 and 232 are normally open. It is apparent that the blocks 218 do nothing more than "flick" the switch closed, since this is sufficient to energize the tabulator magnet and the magnet is immediately held energized until the tabulating movement is at an end. Therefore, these cam blocks can be made very short in length and of the same size. However, when the carriage comes to the determined position, the tabulator magnet TAB. MAG. must be deenergized and this is achieved by means of what is termed a tabulator breaker switch.

*Tabulator breaker switch*

This device is shown in Figs. 1, 21–25, inclusive, and 44. It is associated with the usual tabulator head casing 233 which houses the tabulator levers 234 which are at their lower ends moved by the action of the tabulator unit, later to be described. When thus moved, the upper ends of these levers engage tabulator stop-slides 235 and advance them to intercept tabulator stops 236 disposed on the tabulator rack bar 214. As shown more clearly in Fig. 24, the stop-slides 235 are suitably formed and so nested within the tabulator casing head that when disposed thus they normally assume a position at a slight angle to the front and rear axis of the head and, therefore, are normally slightly laterally displaced. They are resiliently held in this position by means of an elongated pin 237, the head of which bears against the side of the adjacent slide 235. This pin 237 extends through the side wall of the casing 233 and a spring 238 disposed between the head of the pin and the inner wall of the casing urges the pin against the slides to hold them as a group in the angularly off-set position.

Figure 25:
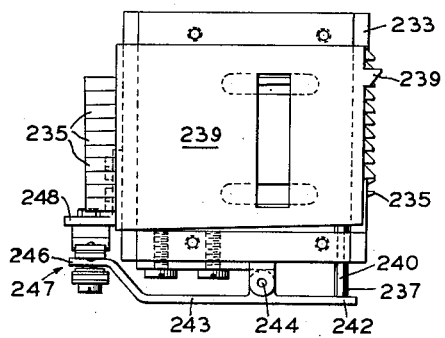
Fig. 25 is a plan view with the cover and control slides removed.

As shown in Fig. 25 the same operative idea is adapted for the skipstop side plate 239 which is disposed in the casing above the level of the slides 235. It is evident that it has been so formed as to permit of slight lateral angular displacement. A pin 240 extends through the side wall of the casing 233 and at its inner end bears against the side of slide plate 239.

The outer ends of pins 237 and 240 bear respectively against lateral extensions 241 and 242 of a plate 243 pivoted on a pin 244 suitably supported on the side of the tabulator casing 233. A spring 245 is coiled around pin 244 and engages the plate 243 and, therefore, tends to urge the pins 237 and 240 inward against the stop plates at all times. The other end 246 of plate 243 is adapted to engage a normally closed contact 247 which is generally denoted as the tabulator breaker contact. The contact is mounted on a bracket plate 248 secured to the back of the casing 233.

It is evident, therefore, that, when the carriage is tabulated, a slide 235 is advanced and is encountered by a stop element 236 on the rack bar 214. No matter which slide 235 is thus advanced, when it is hit by the stop 236 this meeting causes this particular slide and any others which may lie between it and the pin 237 to be displaced laterally so as to push the pin outwardly and move the plate 243. The movement of the plate 243 will open the contact 247. The effect of this opening on the operation of the tabulating mechanism and its bearing on related circuit operations will be clear from the later description of the circuit operation. The same type of operation takes place when the skipstop slide 239 is advanced as will be obvious from the above description.

*Tabulator with (flick type)*

From the above description it is to be understood that when an automatic tabulating lug or cam 218 operates the automatic tabulator flick contacts 230–232, inclusive, the tabulating magnet TAB. M. is energized and releases the tabulating cam. When this is released the tabulator holding contacts are closed and remain closed until the circuit is broken through the tabulator breaker contact just above described. When the tabulator cam is released it moves to operate a tabulator unit and causes the rocking of one of the tabulator levers 234 to advance a desired tabulator stop-slide 235. One form of tabulator unit employed herein and forming a feature of the present invention is that in which automatic or hand tabulation is possible and in which, once the keys are depressed, they do not have to be held down until the end of the tabulating operation. Furthermore, in this form of unit only one tabulating cam is used whereas in the Dodge and Philbin patent, supra, two cams have been required. This first form of unit is preferably called the "flick" type since the keys have only to be flicked to start and complete the operation. Another form of unit employing one cam is called preferably the "holding" type since, although allowing for automatic operation, the keys must be held down until the operation is completed.

The first mentioned or "flick" type of unit is shown most clearly in Figs. 1, 4, 6, 9, 10, 11-15, inclusive, and 20 and 44. It includes a bracket plate 249 fastened to the rear wall of frame 62 and having side plates 250 and 251 spaced apart and extending forwardly therefrom. Many elements shown and operation thereof are illustrated in the above mentioned Dodge and Philbin patent and will consequently only be briefly and generally here described. It comprises a plurality of rocker arms 252 adapted when operated to move slides 253 to engage the lower ends of tubulator levers 234. To each rocker arm 252 is pivotally connected an interponent 254 which is adapted to be engaged by a universal operating bail 255, which carries a roller 256 engaged by the tubulator cam 257. The bail 255 is mounted on and fastened to shaft 258, the left end of which carries an arm 259 (Fig. 10) which when rocked by the shaft presses on the head of plunger 260 mounted on a supporting plate 261 which plunger at its lower end is adapted to actuate tabulator holding switch contacts 262-265, inclusive, for purposes later to be described. The cam 257 is released by operating a latch 266 pivoted on rod 267. The rear end of latch 266 is fastened to a vertically movable plate 268 having a lateral pin 269 thereon (see Fig. 20). The latch 266 and the plate 268 are moved in one instance by a finger 270 extending forward from a bail 271 pivotally mounted on rod 272 (Fig. 9). A tabulator magnet TAB. MAG. is disposed beneath finger 270 and its plunger when elevated lifts this finger and elevates plate 268 and rocks the latch lever 266 as seen in Fig. 20 which shows a modified form of tabulator unit in which the plate 271 is elongated for purposes later to be described. In the present form being described the plate 271 has thereon only the finger 270 lifted by the magnet (see Fig. 9). The bail 255 (Fig. 10) and arm 259 both secured to shaft 258 are held in normal position by a spring 273 and the latch 266 and plate 268 are held in normal position by a spring 274 (Figs. 9, 10, and 20). Equivalents of these two springs are shown in the Dodge and Philbin patent, supra. In another instance, as when the tabulator keys 274A (Fig. 1) are depressed, the plate 268 and the latch lever 266 are moved by the elevation of a finger 275 (Figs. 9 and 20) on a pivoted lift bail 276 supported between bracket side plates 250 and 251. This finger lies normally just under pin 269 on plate 268. Therefore, when the lift bail 276 is rocked, the pin 269 is also lifted to release the latch lever 266.

As noted in Fig. 5, of the Dodge and Philbin patent, it is observed that the left-hand rocker arm of the series is used for automatic tabulation. Similarly, in this invention the leftmost rocker arm 252A as viewed in Fig. 9 is thus employed. It is also to be noted that its interponent 254A (Fig. 13) is normally disposed in a position to be moved by the forward movement of bail 255 whereas formerly it, like all the other interponents 254, has previously been disposed below the line of the bail and had to be lifted to be brought into an operative level therewith. Therefore, when the automatic tabulation cam blocks 218 trip the "flick" switch and energize the tabulator magnet, the tabulator cam is released and the bail 255 is advanced to engage the first interponent 254A which is already in line and this is advanced to move the proper stop-slide 235.

As the cam 257 is released the arm 259 closes the holding switch contacts which hold the tabulator magnet energized until the tabulator breaker switch above described opens the circuit for the tabulator magnet.

In the unit shown there are ten tabulator keys 274A (Figs. 3 and 4) which from left to right are nominated from one to zero, the zero key being used as the skip key. Each key is connected to operate a push link, the rear end of which has a cam surface 278 (Figs. 11-14, inclusive) adapted, when the link is advanced, to extend beneath and lift a roller 279 on the side of a lifting bar 280. The upper end of each of the lifting bars 280 lies under its respective interponent 254 for the 2-0 keys and lifts the same when the key is depressed. As shown each lift bar 280 is provided with a shouldered latch member 281 pivoted thereon, which, when the bar 280 is lifted, passes through a slot in the guide plate 282 and is pressed by a spring 283 to hook on to the guide plate 282 to hold up the lifting bar 280 so that its interponent 254 may be held up even though the push link is withdrawn by taking the finger off the key 274A. Thereafter as the bail 255 is advanced to move the interponent, a shoulder 284 on the interponent will encounter the top of the latch member 281 to move it back and disengage it from the plate 282 so that a spring 285 attached to the lower end of the lift bar 280 may pull it down to normal position. This series of springs is connected to a plate 286 extending beneath the lift bars and connected at its ends to rod 272. Spring 287 on each rocker arm 252 presses down on each interponent 254 to urge it to normal position.

Since the first interponent 254A is used not only for automatic tabulation, but also for manual operation by the #1 tabulator key, the construction of its cooperating elements is somewhat different than the rest of the interponents described. The bar 280A in this case is foreshortened so that it really does not lift the interponent but it still has the latch member 281 thereon to hold it up when lifted by the push link 277A. Adjacent the bar 280A for the first interponent 254A is a special lift bar 288 (see Figs. 13 and 14) the upper end of which lies beneath a plate 289 (Fig. 10) fastened to the side of the interponent 254A. As stated before, this interponent is normally positioned up in line with bail 255 (see Figs. 11, 13, and 14) so that to operate it either by the automatic means or by the depression of the first tabulator key 274A or the palm tabulator key 290 (Fig. 3) which is also connected to operate the first push link 277A, it does not need to be lifted by its special lift bar 288.

However, whenever any of the 2-0 interponents 254 are to be operated, it is obviously necessary to lift the first interponent 254A above its normal position to get it out of the way of the bail 255. When any of the tabulator keys from "2-0" are depressed the push links 277 (Fig. 12) elevate the lift bars 280 and consequently the interponents 254. As shown in Fig. 12, when the lift bar 280 is raised, a shoulder 291 thereon engages the under-surface of a bail 276 to lift the same and cause the finger 275 (Fig. 20) to engage pin 269 on plate 268 and lift this plate and, therefore, as before described, releases the tabulator cam 257. As this bail plate 276 is raised it engages a down-facing shoulder 292 on the special lift-bar 288 for the first interponent 254A and lifts said bar to raise the first interponent 254A to the position shown in Fig. 12 out of the way of bail 255.

It is obvious, however, that when it is desired to press the first tabulator key 274A or the palm tabulator key 290, it is necessary to lift bail 276 to release the tabulator cam 257 but without lifting the first interponent 254A which is already in line with bail 255. To achieve this it is necessary in this operation to laterally displace special lift bar 288 so that shoulder 292 is moved out of the path of the rising bail 276. To this end the push link 277A of the first tabulator key, when moved rearwardly engages a dependent lip 293 (Figs. 13, 14 and 15) on a slide plate 294 which is slotted to receive a guide screw 295 on the lower face of comb plate 296 and to be guided thereby. This plate has a pin 297 adapted to receive one end of a spring 298, the other end of which is connected to the lower end of the special lift bar 288 which projects through an opening in the comb plate 296. Another spring 299 connects with the bar 288 and a pin 300 dependent from frame side plate 251. Therefore, as the first push link 277A is moved it slides plate 296, and the balanced springs 298 and 299 cause the lower end of bar 288 to swing to the position shown in Fig. 14 where it will be seen that shoulder 292 is out of the path of the rising edge of the bail plate 276. A pin 288A is on the side of bar 288 and rests on the plate 282 to act as a pivot point for bar 288 when it is swung to one side. Hence, the first bar 280A will be moved up and latched up by latch member 281 to hold bail 276 up so that the pressure on key 274 can be removed but special bar 288 is not elevated and consequently when bail 255 advances it encounters the first interponent 254A.

It is thought to be clear, therefore, that in this "flick" form of tabulator unit the construction is such as to require any key to be only depressed momentarily instead of being held down. It also provides that upon automatic tabulation no interponent needs to be lifted since the first interponent 254A is already in position. It also provides that when any key from 2–0 is pressed to lift an interponent the first interponent 254A is moved out of the way so that two interponents will not be moved by the bail 255 at the same time.

*Tabulator unit (holding type)*

This modification is shown particularly in Figs. 16–20, inclusive, and concerns one in which, except for the "one" tabulator key, the tabulator key must be held down until tabulation is complete. However, in many respects the unit is similar to the one just described and to that shown in the Dodge and Philbin patent, supra. Parts which are the same as in the above described "flick" type of unit will bear the same numerals.

In this type there is still the tabulator magnet whose plunger when activated elevates finger 270 (Fig. 20) on plate 271, which in this instance, is elongated to extend clear across the bottom of the unit and is provided with another finger 301 which is positively connected to the lower end of the first lift bar 280A which (Fig. 20) has no shoulders thereon so its elevation does not affect bail plate 276. The bail plate 276 is cut away at 302 so that roller 279 on the first bar 280A will not move bail 276 as said bar is lifted. Hence, when the tabulator magnet is energized it lifts finger 270, rocks bail 271, lifts finger 301 and bar 280A and consequently the interponent there-above 254A. As described previously, lifting finger 270 trips the latch 266 and releases the tabulator cam and this in turn energizes the tabulator magnet holding switch. Therefore, the magnet remains energized until tabulation is completed and the circuit broken through the tabulator breaker switch.

Now, if it is desired to operate this unit by pressing either the palm tabulator 291 or the first decimal key 274A the push link 277A will ride under roller 279, lift bar 280A and through the fingers 301 and 270 and plate 271 will lift latch 266 and release the cam. As the cam moves the holding switch will energize the tabulator magnet which will then maintain the finger 270 in raised position even when the palm or first decimal key is released. In this form, therefore, the palm and first decimal keys have the "flick" feature of the form previously described.

However, when any of the "two to zero" decimal keys are pressed the push link 277 engages roller 279 to lift bar 280 which in these positions have shoulders 291 and these when raised engage and rock bail 276 as before, thus releasing tabulator cam 257 as previously described. As shown in Figs. 18–20, inclusive, a plunger 303 is disposed beneath bail 276. This plunger is suitably supported and its lower end engages a contact 304 which is normally closed when the plunger is held down by the bail 276. Whenever this bail is lifted the natural resiliency of the spring members forming the contact 304 forces them apart since the plunger has moved up. This contact is in circuit with the tabulator magnet so that it will not be energized when any of the "two to zero" keys are depressed. Therefore, the "two to zero" keys in this form must be held down until tabulation is completed. This construction is provided to present a simpler form which is cheaper to make than the other. The contact 304 is provided so that when depressing the "two to zero" tabulator keys the tabulator magnet will not be energized, thus preventing the first bar 280A from being lifted and jamming its interponent under the bail 255.

*Sensing device*

Figure 2:
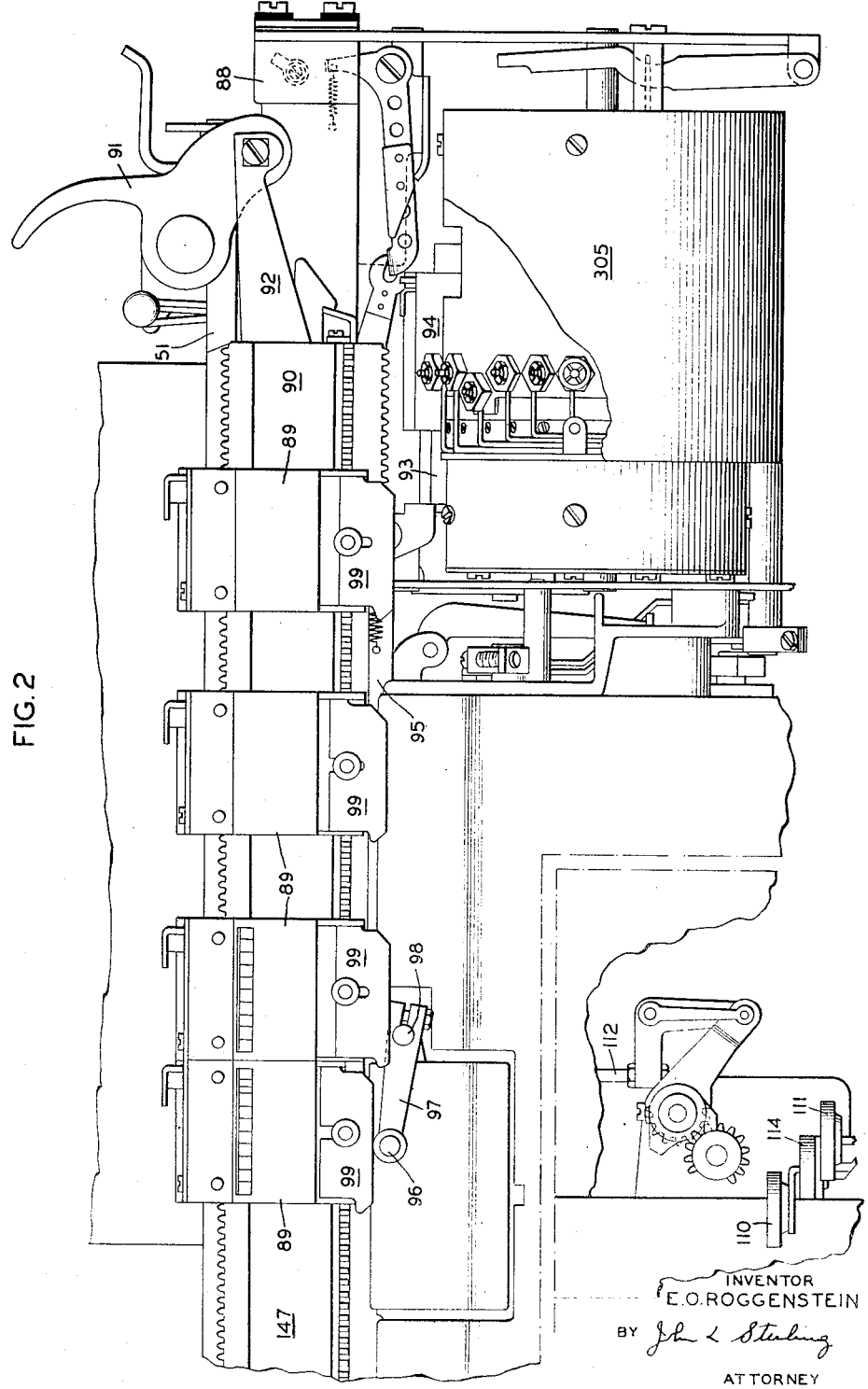

As shown in Figures 2 and 46 the sensing device is generally designated as 305 and is the same as that shown in my co-pending application S. N. 369,399 except that in the present device the machine is designed for accounting in terms of American money rather than English money. It forms no part of the present invention and any detail description thereof is not believed necessary. However, generally speaking the usual sensing discs on the cross totalizer 94 are moved across the sensing finger of the sensing device to selectively close circuits through relays and magnets to operate the printing and other magnets.

*Control contacts*

Figure 23:
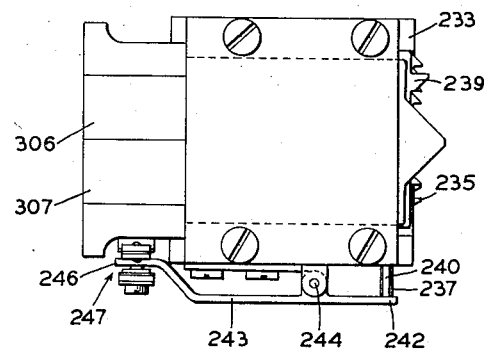
Fig. 23 is a top plan view of Fig. 21.
Figure 24:
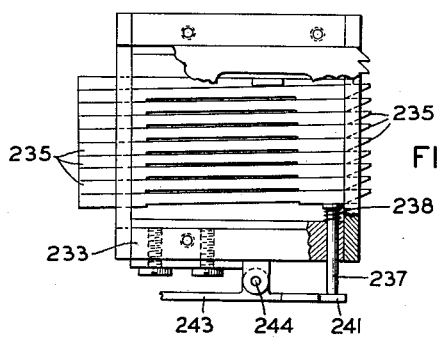
Fig. 24 is a plan view of Fig. 21 with the cover, the control slides and the skip stop slide removed.
Figure 21:
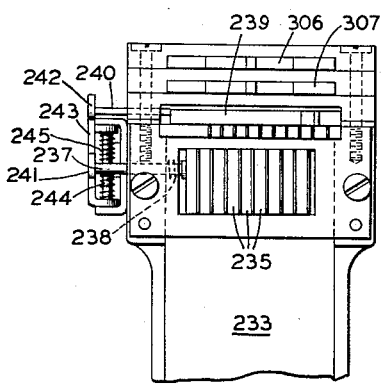
Fig. 21 is a front elevation of a part of the tabulator head showing the tabulator break switch.
Figure 22:
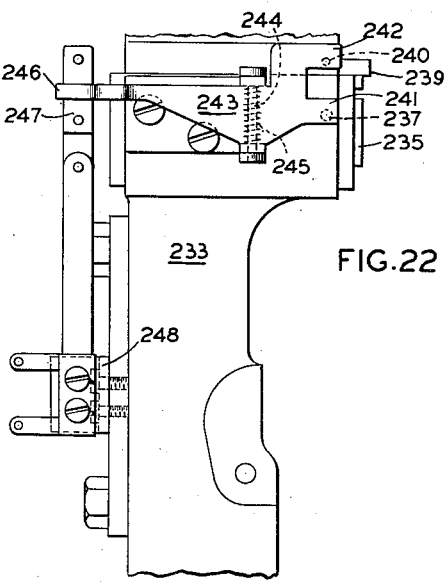
Fig. 22 is a side elevation of Fig. 21, showing the break switch operated by the carriage.

As shown in Figs. 1 and 23, the tabulator casing 233 at the top thereof and above the stop-slides therein is provided with upper and lower slide plates 306 and 307 having beveled front edges which are adapted to be engaged by upper and lower control cams 308 and 309 mounted on the top of the tabulator stops 236 (Fig. 1) in desired positions along the tabulator rack bar 214 in order to effect certain circuit results which will be described more fully later. These slides open and close selectively a plurality of control contacts which in Fig. 1 are generally and inclusively given the number 310 although later in the description of the circuit operation they may be separately designated in order to set forth their individual function and operation.

Relays

The wiring diagram (Figs. 44, 45, 46, and 47) contains the relays R1, R2, R3, R4, R5, R8, and R9 in addition to relay 174 (already described). All of the relays except relay 174 have generally the same functions and operate substantially in the same manner as already set forth in my application S. N. 369,399. Any changes in their operation and any new circuit controls effected by them will be set forth in detail hereinafter.

CIRCUIT OPERATION

Tabulation to total column

After the operator has entered the last item manually, the automatic tabulator blocks 218 are disposed to close the "flick" switch as described. This closes a circuit to the tabulator magnet as follows: From the upper side of the secondary of the transformer TRANS., over wires 311 and 312, through A. C. contact 231 on AUTO. TAB. "flick" switch, wires 313 and 314, through carriage A. C. contact 108, normally closed, wire 315, through inner right hand plate of the rectifier, through the inner left hand plate of the rectifier, over wire 316, to the secondary of the transformer.

The tabulator magnet is energized then as follows: From ground over wire 317, through contact 232 on AUTO. TAB. "flick" switch, over wire 318, through tabulator solenoid TAB. SOL., wire 319 (Figs. 46 and 47), through TAB. contact on relay R8, which is now closed, since relay R8 is energized, thence over wire 320 to the positive plate of the rectifier. Relay R8 is energized at this time as follows: From ground through the R9 contact on relay R4, over wire 322, through normally closed contact R8 on relay R5, over wire 323, through coil of relay R8, over wire 324, through TAB. SOL. contact 247 of the TAB. BRK. switch, over wires 325 and 320, and thence to the positive plate of the rectifier.

As explained heretofore, when the tabulator cam 257 is released and starts to rotate, the automatic tabulator holding switch is operated to hold the tabulator solenoid TAB. SOL. energized over the following circuit: From ground through contact 264 of the AUTO. TAB. holding switch, over wire 326, to wire 318 through the tabulator solenoid, thence back to the positive rectifier plate as previously traced.

The carriage is thus released in the usual manner to move to the proper stop position. When the stop 236 encounters the projected stop slide 235, the tabulator solenoid contact 247 is opened and this breaks the circuit of relay R8 above. Relay R8, however, is a slow release relay and there is an appreciable interval before it deenergizes and opens its tabulator contact TAB. to open the circuit for the tabulator solenoid. This permits time for the moving parts to come to rest before the tabulator mechanism is restored to normal. It is noted that when the holding switch is operated, an R1 contact 265 is closed which energizes relay R1 over the following circuit: From ground through the R1 contact 265 on the tabulator holding switch, wire 327 through coil of relay R1, wires 328 and 320 back to the positive plate of the rectifier. This energization of relay R1 keeps its common contact COM. open to prevent printing until tabulation has ceased.

When tabulation ceases, the carriage has arrived at the point where a control cam is mounted on top of the stops 236 in the manner described in my previous applications. If a simple total is to be taken out of the left register 94, a cam such as shown in Fig. 35 is used. This cam has two levels which are designated A. C. and COM. As the A. C. level encounters the lower control slide plate 307, the control contact A. C. (Fig. 44) is closed applying power to the circuit for the printing magnets. While relay R1 is operated, the sensing circuit through shift contact SH. of relay R1 senses for a negative total. If there is one, relay R4 is energized. This takes place while relay R1, which is a slow release relay, is deenergizing. As explained in my previous application 369,399 as soon as relay R1 releases, the common circuit contact COM. on relay R1 is closed and the device is ready for printing. If the first figure are zeros, the R2 relay is not operated, and the impulse from the sensing device is passed to the space magnet, through the SP. contacts of relay R2, causing the carriage to space. As soon as a significant digit is sensed, relay R2 is operated by means of the operation of the actuator switch, and opens its contact SP. and closes its contact 0, so that, as subsequent zeros are sensed, the impulse is transmitted to the 0 printing magnet. By changing the star-space switch 321 from contact SP. to contact ST., stars may be printed instead of spacing before the first significant digit if desired.

Check numbering operation

This device has been described, supra, briefly and includes an injector control cam 330, shown in Fig. 32. To achieve this operation, the triangle control contact TRI. (Fig. 44) is employed to impulse the #1 printing magnet. When tabulating to the column of the register in which the automatic "one" is to be injected, this contact TRI. is closed by the upper level cam 329 (Fig. 32). This same cam also opens the control contact 2–0 (Fig. 44) so that energization of any numeral magnet other than "one" is prevented. The lower level cam 330 (Fig. 32) closes the A. C. and COM. control contacts as usual. The circuit over which the #1 printing magnet is thus energized is as follows: From the middle plate of the rectifier, wire 331 through control contact TRI., wire 332, through contact CHK. on relay R2 (now deenergized), wire 333, to the center spring of the #1 contact on relay R5 (now released), wire 334, through #1 contact on relay R4 (now released), wire 335, through the #1 printing magnet, wire 336, through common control contact COM., wire 337, through common contact COM. on relay R9 (now operated), wire 338, through common contact COM. on actuator switch, wire 339, through contact 150 at the timing magnet, wire 340, through contact COM. BK. on relay R4, wire 341, through contact 211 on back space magnet B. S. M., wire 342, through contact COM. on relay R1 (now released), wire 343, through contact 179 on special relay 174, wire 344, through common contact 230 on the flick switch, wire 345, through contact 262 on the holding switch, wire 346, through the on and off switch, wires 347 and 320 to the positive plate of the rectifier.

When using an F. C. or decimal-space style of register, a special cam is placed on the rack, such a cam being shown in Fig. 31. This cam is adapted for the injection of "one" on an F. C. register. The decimal space position on the lower level 348 of this cam is provided with an extreme high point which is used to break the left shift control contact L. SH. which, on a check writing machine, is operated by the lower cam. This is necessary to prevent shifting of the carriage when tabulating from the dollar to the decimal space position when a figure "nine" (which would act as a shift wheel) is registered in the dollar column. The L. SH. control contact which is operated by the lower plate 348 of this cam (Fig. 31) will only break the shift circuit when taking a total from the right register. This is necessary to prevent the left register from shifting the carriage when taking a positive total from the right register. This high point also breaks the space-common control contact SP. COM. to prevent a zero in the digit wheel in the right totalizer from spacing the machine.

*Automatic printing with banked registers*

When registers are disposed on the carriage side by side as are the first two shown on the left in Fig. 2, the invention provides means to move from one register to another by spacing without tabulation. This control is effected by means of a special slow release relay 174 (Fig. 45). In conjunction with this relay there is a special control cam 350, a portion of which is shown in Fig. 41. This is really the same as joining adjacent ends of cams such as are shown in Figs. 35 and 36, with their A. C. levels overlapping as indicated at 351. There must be as many of these joined cams as there are totalizers abutting each other. When this cam 350 reaches depression 351 for any one register, the control slide drops back, opening the printing magnet circuit, but still, let us say, maintaining the start printing circuit closed, or the triangle printing circuit, as the case may be, depending on whether a sub-total or a total symbol is to be printed, or whether the total is taken out of a left or a right register. Assuming that it is the star symbol, if the left register is clear, the clear signal mechanism 352 (Fig. 46) will close a circuit as follows: From ground on machine, through mechanism 352, wire 353, through star contact ST. on relay R3, wire 354, through control contact ST., wire 355, through contact ST. or relay R2 (which is operated), wires 356 and 357, through the star magnet ST., wires 358 and 337, to the closed contact COM. on relay R9, wire 338 back to the rectifier as previously traced, causing the star magnet ST. to print a star. It is to be noted that, at the same time that this circuit is closed over wire 357, leading to the star magnet, another circuit is also closed over a wire 359 leading from wire 357 through star coil of special relay 174, wire 360, to wire 343 which is in the return circuit of the rectifier previously traced. This energizes the special relay 174 which is provided with an R1 contact 178 and a break contact 179 which is in the return circuit of all the relays and magnets except relay R1. The contact 178 completes a circuit for relay R1 which opens the main return circuit at its contact COM., so no numeral printing can then take place. Thus, if a credit balance exists, or the relay R3 is to be energized for a transfer, the mechanism has an opportunity to return to normal before the next balance can be printed. Relay 174 is a slow release relay which holds the digit printing circuits open until the star has been printed and has spaced the carriage to the level COM., of cam 350 (Fig. 41). The two separate coils of the relay 174 operate on a common armature from either a star or a triangle impulse independently.

The return circuit for both coils is joined and goes through the contact 179 of this relay. This contact is adjusted to break very late in the stroke so that contact 178 of this relay, which makes immediately, can energize relay R1 to establish circuits for shifting the carriage if another credit balance is in the next register, or to operate relay R3 to transfer from a left to a right register. Therefore, the star is printed, the carriage spaced, a negative total is sensed, and a transfer may be made, after which the special relay 174 releases, and relay R1 is deenergized, and printing of the next total can take place.

*Tabulation to selected distribution column*

This enables the carriage to be tabulated to a particular column and then have the carriage stopped and not started again to print until a starting solenoid button 156 is operated. The tabulation is generally effected by means of the usual skip tabulation key. In combination with this starting solenoid 157, there is employed a special cam which in all respects is like that shown in Fig. 35, except that the right hand A. C. level thereof is twice as long, as shown by the dotted lines in said figure. When the carriage is tabulated to a position to bring this cam into plat and the carriage stops, only the A. C. control contact is closed, the double-width A. C. level preventing the usual closing of the common control contact COM. Therefore, the printing circuits are open and no printing takes place. However, a return circuit for the printing magnets is provided through the starting solenoid 157. When the plunger 156 thereof is pushed in, it closes three contacts called respectively "LOCK," "COM.," and "SP. COM." The "lock" contact when closed locks up the starting solenoid over a holding circuit as follows: From ground, wire 361, through contact "LOCK," wire 362, through coil of the starting solenoid 157, wire 363, through starting solenoid control contact ST. SOL., wire 364, to break contact 179 on special relay 174, wire 344 to rectifier as previously traced. If the first number to be printed is a zero, and we desire to space instead of printing a zero, the space-start switch 321 is moved to the SP. position and the circuit is as follows: From ground on the register, through the usual circuit for the zero, to the zero contact on R4, over wire 365, through space contact SP. on relay R2 (which is released), wire 366, to the center connection of the ST.-SP. switch, wire 367, through the space magnet SP., wire 368, through space-common contact SP.-COM. and common contact COM. on the starting solenoid 157, thence over wires 369 and 337, to contact COM. on relay R9, wire 338, and to rectifier as previously traced. If the first number is a significant digit such as a "six," then the circuit is as follows: From the registers over the usual circuit to the 6 magnet, wire 370, through control contact 2—1, wires 371, and 336, and 372, Fig. 45, through common contact COM., on starting solenoid 157, wires 369 and 337 to the rectifier as previously traced. When either the space magnet SP., or the numeral magnet 1—9 is energized, the carriage is spaced and the special cam is moved one step to bring the higher common level COM. into play to close the common control contact COM. and establish the return circuit, after which the printing of the rest of the total proceeds in the usual manner. At the time the common cam level COM. is effective, the starting solenoid control contact ST. SOL. is opened by this level of the cam and opens the holding circuit for the starting solenoid, which releases, opening its lock contacts which are then restored to normal.

Credit balance lock-up device

In this feature of the invention, whenever the machine is ready to print a negative balance, the carriage locks up as a signal to the operator. As shown in the drawings, the return circuit for the printing magnets passes through a contact nominated COM. BK. on relay R4, which relay operates when a negative total is to be printed, opening this contact, and, therefore, printing cannot occur and the machine stops. When the plunger 153 of the credit balance solenoid 154 is pressed, it closes contacts "LOCK" and "COM." associated therewith. The locking circuit for the credit balance solenoid is established as follows: From ground, wires 361 and 373, lock contact "LOCK" of the solenoid 154, wire 374, coil of solenoid 154, wires 375 and 343, break contact 179 on special relay 174, wire 344 back to the rectifier as previously traced. When the total is printed and tabulation takes place, this return circuit is opened either at contact COM. on the flick switch 230 or at the contact 262 on the holding switch, in which case the solenoid 154 is deenergized. The return circuit for the printing of negative totals when the plunger 153 is pushed, is established through the contact COM. on credit balance solenoid 154 as follows: Assuming numeral "5" is to be printed, then a circuit extends from the registers through contacts 5 on relays R3, R4, and R5 to the 5 magnet, then over wire 370, through control contact 2-0, wire 371, through the control contact COM., wire 337, through contact COM. on relay R9, wire 338, through contact COM. on actuator switch, wire 339, through contact 150 on timing magnet, wire 340, and then, since the contact COM. BK. on relay R4 is open, through contact COM on credit balance solenoid 154, wires 376 and 341, through contact 211 on back space magnet B. S. M., wire 342, back to the rectifier as previously traced. Therefore, it is seen that when the contact COM. BK. on relay R4 is opened to stop printing, the contact COM. on the credit balance solenoid 154, when closed, establishes parallel return circuit for the printing magnets.

Automatic proof symbol circuit

*Left cross register.*—The purpose of this circuit is to obtain a star symbol from the left register if the same has been manually cleared. If a figure is left in the register, however, printing of the automatic symbol cannot occur, and the keyboard would be locked up. Printing of this automatic symbol is made possible by a special proof cam which is placed on the tabulator rack so that the control contact A. C. only is closed in the position in which the symbol is to be printed. The upper slide 306 is never operated when taking an automatic proof from the left register. On a machine adapted for this type of operation, it is necessary to adjust the star contact ST. on relay R2 so that it will remain closed whether the relay R2 is operated or released. The proof cam 378 is shown in Fig. 39, in which the level 377 is such as to close the control contact A. C. only. When this operation is desired, the carriage is tabulated to the proper column to bring the cam 378 into position. The level 379 of this cam is ineffective to operate any control contacts but the machine is now manually operated to print the total, which the operator reads from her records, not from the balance in the machine. The general operation briefly is as follows: We will assume that we wish to get the proof symbol from the left register. When the operator prints a balance forward on the sheet manually, it is entered into the right cross register but not into the left cross register. She then prints the deposit, and a withdrawal, which are entered into both the right and left cross registers. The machine then automatically prints the total in the right cross register, and if this register is cleared, a star is printed. As this right cross register is cleared, the totalizer cams are set to subtract this total from the left register. The machine is then tabulated to the proof symbol column where the cam 378 comes into play and the carriage is stopped. The operator here manually enters into the left cross register, the balance forward noted on her records. If this is the same as she previously has entered into the right cross register, the left register will be cleared and a star will be automatically printed. If this entry does not correspond to what was entered on the sheet, the register will not be cleared, the symbol will not be printed and the machine will lock up. As an example, take the following: The operator enters a $100.00 balance forward in the right cross register.

| Left cross | Right cross |
|---|---|
| Plus 50.00<br>Minus 50.00<br>Minus 100.00 | Plus 100.00 balance forward<br>Plus 50.00 deposit<br>Minus 50.00 withdrawal |
| Minus 100.00 total | Plus 100.00 total |
| Plus 100.00 added manually<br>* symbol printed | |

This is not entered in the left register. She then enters a $50.00 deposit in both registers, also a $50.00 withdrawal in both registers. She then has in the right register a total of plus $100.00. This is automatically printed and the right register is cleared and a symbol is printed automatically. At the same time this total of plus $100.00 is subtracted from the left register, giving it a total of minus $100.00. The carriage then is tabulated to the proof of symbol column, when the operator looks at her record sheet and notes the balance forward and adds it manually into the left register. It is seen that if she has previously entered the correct balance forward, this last operation will clear the left register and the cam 378 will be moved to the position where the proof symbol will be automatically printed.

*Right register.*—If the right register is used for the automatic proof symbol, a cam such as shown in Fig. 40 is employed. This cam 380 has a manual level 381 on the lower plate thereof as well as an A. C. level 382 thereon. It also has an upper plate 383 which has a level 384, which is on the same plane as the A. C. portion of a standard cam. This level 384 controls the energization of the transfer relay R3. On a machine using the right register for a proof of symbol operation, it is necessary to permanently close the contact R3 on relay R1 and the triangle contact TRI. on relay R2. In this instance, of course, since the right register is to be used for the proof symbol, the left register is used for the balance, in which case the contact ST. on relay R2 is not permanently closed as previously mentioned. In other respects the operation is as before. The permanent closing of contact R3 on relay RI holds relay R3 operated, thereby opening its star contact ST. and closing its triangle contact TRI.

*Automatic date printing*

By placing an automatic date cam 385 (Fig. 33) on the tabulator rack, the automatic date will print in any position of the carriage. The number of dates printed depends entirely upon the number of such cams on the carriage. This cam comprises lower plate 385 and upper plate 386. When the carriage is tabulated to the date column, as the date cam (Fig. 33) comes into play, the level 387 of the lower plate 385 closes the control contact A. C. closing a circuit to the keylock magnet, which immediately energizes and locks up all keys as well as the space bar so that the date cannot be printed on top of written matter. The level 388 of the upper plate 386 is adapted to close the control contacts RI and TRI. This level of the plate 386 is adapted to open the control contact RIBK. and to close the control contact DATE—RET. The low level 390 of the plate 385 is adapted to break the control contact A. C. which eliminates the possibility of repeat printing of the date.

When tabulating to the date column, the control contact A. C. is closed by the lower plate 385 at level 387. Therefore, the rectifier is supplied with current to operate the RI and R8 relays. Relay RI opens its contact COM. and relay R8 closes its contact DATE—R2. The relay R8 is energized from the positive plate of the rectifier, wires 320 and 325, through TAB. BRK. switch contact TAB. BK., wire 324, through coil of relay R8, wire 323, contact R8 on relay R5, wire 322, contact R9 on relay R4, to ground. Relay RI is energized from the negative plate of the rectifier, wire 331, through control contact RIBK, wire 391, through control contact RI, wire 392, through control contact RI AUTO. NUM., wire 393, to contact DISC. on relay R2, wire 394, wire 327, to coil of relay RI, wire 328, and wire 320 to the positive plate of the rectifier. As the carriage proceeds to the date printing column, the high level 389 of the plate 386 closes the date return control contact DATE. RET. and opens the control contact RI BK. This deenergizes relay RI, but, since this is a slow release relay, it gives the parts time to come to rest before relay RI fully releases and closes its contact COM. When this happens, the circuit for the date magnet is energized from the negative plate of the rectifier, wire 331, through control contact TRI. closed by level 388, wires 332 and 395, through date magnet, wire 396, through the control contact DATE. RET., closed at level 389, wire 397, through the contact DATE—R2 on relay R8, wires 398 and 342, through contact COM. on relay RI (not operated), wire 343, through BK. contact 179 on special relay 174 over wire 344 back to the positive plate of the rectifier as previously traced. When the date magnet energizes, the date is printed and the carriage is spaced in the manner previously described. As spacing occurs, the depression 390 on cam plate 385, causes the opening of the control contact A. C. to prevent reprinting.

*Carriage return to intermediate position*

The mechanical operation of this device has already been described. As previously described, when the carriage return lever is manually operated, it opens first the A. C. contact 108 and then closes the contacts 165, 166, and 167 on the intermediate stop switch. As soon as the intermediate stop is contacted, the A. C. contact 108 is closed. This establishes the following circuits: (1) From the secondary of the transformer over wire 399, through A. C. contact 167 on the intermediate stop switch, wire 400, through A. C. contact 108, wire 315 to the rectifier, back to the other side of the secondary of the transformer over wire 316; (2) From ground through contact 166 of the intermediate stop switch, wires 401 and 326, through the coil of the tabulator solenoid TAB. SOL., over wire 319, through contact TAB. on relay R8, wire 320, to the positive plate of the rectifier. When the first tabulator stop is encountered, the tabulator break switch 233 is operated, opening the tabulator solenoid contact 241, and the parts come to rest, but in this case, as long as the operator holds the carriage return key down, the contact 165 on the intermediate stop switch is closed, and this is in parallel to the contacts 241, so that the relay R8 remains energized and consequently the contact TAB. thereon remains closed, continuing the tabulation until the operator releases the carriage return key.

*Decimal skip, double back space*

The mechanical operation of the back space magnet has been described whereby when the back space key is operated, the carriage will be back-spaced two steps instead of one, over the decimal point. When the back-space key is manually depressed, the usual mechanism is released to back space the carriage by releasing the back space power cam 205. This will produce one back-space operation. When the cam is released, however, it will be seen that its associated B. S. contact 212 will be closed by arm 209. This establishes a circuit for the back space magnet which will cause the cam to make another rotation to effect another back-spacing operation automatically. The purpose of this feature is also to obtain automatic spacing over the decimal and the comma spaces of any register on the vertical truck. The decimal stop cam employed may be the same as that used for the automatic proof symbol for right register shown in Fig. 40. In this cam, which has two plates 380 and 383, there are high points of levels 382 and 384, respectively, on the lower plate 380 and the upper plate 383. These high points overlie each other and operate as follows: When the cam is positioned with the high points in line with the decimal position on the vertical totalizer, the lower level 382 will close only the control contact A. C. thus connecting the rectifier in circuit. The upper level 384 will close the control contact DEC. SKIP but will not break the control contact DEC. SKIP SP. When this position is reached and these control contacts are closed, the circuit is as follows for the purpose of energizing the space magnet: From space sensing finger on the left register, wire 402, through space contact SP. on relay R3, wire 403, wire 367 through the space magnet, wires 368, 404, and 405 through control contacts DEC. SKIP and DEC. SKIP SP., wire 337, to contact COM. on relay R9, wire 338 back to the rectifier as previously traced.

If a register is used having comma positions as well as a decimal position and it is desired automatically to skip over these positions, it will be obvious that a skip cam sufficiently elongated need only be provided with the above described upper and lower high points at the proper places thereon to achieve this result.

The purpose of the control contact DEC. SKIP, operated by the upper level of the decimal skip cam is to prevent spacing of the carriage when the cross register moves to the right after taking a sub-total from the left or right register. We know that as the cross register moves to the right, the space disc in the cross register would contact the space sensing finger before the reset arm would contact the proof of clearance cam. Therefore, if the return circuit for the space solenoid SP. was complete, the carriage would space before the star could be printed, and, as the carriage moved to the right one space, the control contact A. C. would open and the printing of the clear signal would not occur. Since the upper level cams of the left register or right register total or sub-total cams (see 406, 407, and 408, Fig. 37) extend one-sixteenth of an inch farther to the rear than the upper level 384 on the decimal skip cam, they will open the decimal skip common breaker control contact DEC. SKIP SP. and prevent the carriage from spacing as described above. When the back space magnet B. S. M. (Fig. 45) is energized, it opens contact 211 which by wires 341, 340, and 339 connects to the contact COM. on the actuator switch. It is necessary to open this contact 211, which is in the common return circuit, when back spacing over the decimal position, since the decimal space sensing disc connects the sensing finger, and the space solenoid SP. would be energized and back spacing over the decimal space position would be impossible.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine of the class described, having a movable carriage and a rack bar thereon, the combination of a tabulator flick switch, a tabulator magnet in circuit with said flick switch, an operating member for said flick switch, means on the rack bar to engage the operating member as the carriage moves, to momentarily close the flick switch and thereby energize the tabulator magnet, a tabulator unit set in operation by the energization of the tabulator magnet, a tabulator holding switch in circuit with said magnet, and means operated by the movement of the tabulator unit when set in operation by the energization of the tabulator magnet to close said holding switch whereby the tabulator magnet is held energized.

2. In a machine of the class described, having a movable carriage and a rack bar thereon, the combination of a tabulator flick switch, a tabulator magnet in circuit with said flick switch, an operating member for said flick switch, means on the rack bar to engage the operating member as the carriage moves, to momentarily close the flick switch and thereby energize the tabulator magnet, a tabulator unit set in operation by the energization of the tabulator magnet, a tabulator holding switch in circuit with said magnet, means operated by the movement of the tabulator unit, when set in operation by the energization of the tabulator magnet, to close said holding switch whereby the tabulator magnet is held energized, a slow release relay, a normally closed tabulator breaker switch in circuit with said slow release relay, means on the carriage to open said breaker switch when the carriage reaches the end of its tabulating movement to deenergize said slow release relay, contacts controlled by said slow release relay and in circuit with the tabulator magnet, said contacts closed when said slow release relay is energized whereby the tabulator magnet circuit is opened when the slow release relay is deenergized.

3. In a machine of the class described, having a movable carriage and a rack bar thereon, a tabulator unit, a tabulator magnet energized by the movement of the carriage to set said unit in operation, a holding switch in circuit with said magnet, means operated by the movement of the tabulator unit, when set in operation by the energization of the tabulator magnet, to close said holding switch whereby the tabulator magnet is held energized, a tabulator magnet breaker switch, means on the carriage to open said breaker switch when the carriage reaches the end of its tabulating movement, and means associated with said breaker switch to effect the deenergization of the tabulator magnet.

4. In a machine of the class described, having a movable carriage and a rack bar thereon, a normally closed tabulator breaker switch, a slow release relay in circuit with said breaker switch, and means on the carriage to open said breaker switch when the carriage reaches the end of its tabulating movement to deenergize said slow release relay.

5. In a machine of the class described, having a movable carriage and a rack bar thereon, a normally closed tabulator breaker switch, a slow release relay in circuit with said breaker switch, means on the carriage to open said breaker switch when the carriage reaches the end of its tabluating movement to deenergize said slow release relay, a tabulator magnet and contacts controlled by said slow release relay and in circuit with said tabulator magnet, said contacts being opened when said slow release relay is deenergized whereby the tabulator magnet is deenergized.

6. In a machine of the class described, having a movable carriage and a rack bar thereon, a stop on said bar, a tabulator head, a plurality of projectable tabulator slides housed in said head for longitudinal projection and lateral displacement, a switch, and means connecting the switch and the slides to operate the switch when any projected slide is laterally displaced by contact with the stop on the rack bar.

7. In a machine of the class described, having a movable carriage and a rack bar thereon, a stop on said rack bar, a tabulator head adjacent said rack bar, a plurality of projectable tabulator slides housed in said head for longitudinal projection and lateral displacement, means for projecting said slides individually, a normally closed switch, and means connecting the switch and the slides to operate and open said switch when any projected slide is laterally displaced by contact with the stop on the rack bar.

8. In a machine of the class described, having a movable carriage and a rack bar thereon, a stop on said rack bar, a tabulator head adjacent said rack bar, a set of projectable decimal tabulator slides disposed at one level in said head for longitudinal projection and lateral displacement, a skip-stop slide also housed in said head at another level for longitudinal projection and lateral displacement, a plate pivoted to the side of the head, forwardly extending arms on said plate disposed at both said levels, another arm on said plate extending to the rear of the head, rods connecting said first named arms with the slides, spring means to urge said rods against the slides to hold them in a predetermined displaced position, a normally closed switch engaged by the rearwardly extending arm on said plate, said plate adapted to be pivotally moved when the stop contacts a projected slide to displace said slide laterally whereby the rearwardly extending arm on the plate operates to open the switch.

9. In a machine of the class described, having a movable carriage and a rack bar thereon, a stop on said bar, a tabulator head, a plurality of projectable tabulator slides housed in said head for longitudinal projection and lateral displacement, a switch, means connecting the switch and the slides to operate the switch when any projected slide is laterally displaced by contact with the stop on the rack bar, said switch adapted to be opened when the projected slide is thus laterally displaced, and a slow release relay in circuit with said switch.

10. In a machine of the class described, having a movable carriage and a tabulator rack bar thereon, a stop on said bar, a tabulator head, a plurality of projectable tabulator slides housed in said head for longitudinal projection and lateral displacement, a switch, means connecting the switch and the slides to operate the switch when any projected slide is laterally displaced by contact with the stop on the rack bar, said switch adapted to be opened when the projected slide is thus laterally displaced, a slow release relay in circuit with said switch, a tabulator magnet, and contacts in circuit with said magnet, said contacts controlled by said slow release relay and adapted to be closed when said relay is energized.

11. In a machine of the class described, a tabulator unit which comprises an interponent, means for lifting said interponent to a position to be operated, means on the lifting means to lock the lifting means in the elevated position, means on the interponent and effective at a predetermined point in the movement of the interponent to engage and release said locking means whereby the lifting means is released from its elevated position, and means to restore the lifting means to a normal position when thus released.

12. In a machine of the class described, a tabulator unit which comprises a series of interponents one of which is normally disposed in an operative position, manually operable means to raise the other interponents from inoperative to operative position and means connected to said first mentioned interponent and actuated by the elevation of any other interponent to move the first interponent from the operative to the inoperative position whenever any other interponent is elevated.

13. In a machine of the class described, a tabulator unit which comprises a series of interponents one of which is normally disposed in an operative position, a lifting element associated with each interponent, key operated means for actuating said lifting elements, and a universal bail operated by the elevation of a lifting element and associated with the lifting element of the first interponent to move said first interponent from the operative to the inoperative position whenever any other interponent is elevated.

14. In a machine of the class described, a carriage, a tabulator unit which comprises a series of interponents one of which is normally disposed in an operative position, an actuating bail, a power operated cam to actuate said bail, a latch associated with said cam to normally hold it inoperative, and means rendered effective to the movement of the carriage to release said latch whereby the cam will actuate said bail and move said interponent.

15. In a machine of the class described, a carriage, a tabulator unit which comprises a series of interponents one of which is normally disposed in an operative position, an actuating bail adapted when operated to move said interponent, a power operated cam to actuate said bail, a latch associated with said cam to normally hold it inoperative, a magnet to trip said latch and release said cam, and means rendered operative at a predetermined point in the travel of the carriage to energize said magnet.

16. In a machine of the class described, a carriage, a tabulator unit which comprises a series of interponents one of which is normally disposed in an operative position, an actuating bail adapted when operated to move said interponent, a power operated cam to actuate said bail, a latch associated with said cam to hold it normally inoperative, a magnet to trip said latch and release said cam, a switch in circuit with said magnet and means on the carriage to operate said switch and energize said magnet at a predetermined point in the travel of the carriage.

17. In a machine of the class described, a tabulator unit which comprises a series of interponents one of which is normally disposed in an operative position, an actuating bail, a power-operated cam to actuate said bail, a latch associated with said cam to normally hold it inoperative, a releasing bail associated with said latch, a plurality of tabulator keys, and means operated when a key is actuated to move said releasing bail.

18. In a machine of the class described, a tabulator unit which comprises a series of interponents the first of which is normally disposed in an operative position, an actuating bail, a power-operated cam to actuate said bail, a latch associated with said cam to normally hold it inoperative, a releasing bail connected to said latch, a lifting link disposed beneath said first interponent, a locking link disposed adjacent said lifting link, a tabulator key, a push link operated thereby, means on the locking link to actuate said releasing bail, and means on said push link to laterally move said lifting link associated with said first interponent whereby said link is not raised by the operation of the releasing bail.

19. In a tabulator unit, a first interponent, a lifting link thereunder, an actuating bail, said interponent normally in line with said bail, a push link for said interponent, a power cam for said actuating bail, a latch for said cam, a releasing bail connected to said latch, and means operated by the push link to actuate said releasing bail whereby said cam is released to operate said actuating bail to move said first interponent.

20. In a machine of the class described, a carriage, a tabulator unit which comprises a series of interponents the first of which is in a normal raised position to be operated, means operated by the movement of the carriage to operate said first interponent, a series of tabulator keys, means operated by one of said keys to operate said first interponent, means operated by another key to operate another interponent and means actuated by the operation of the other key to move the first interponent from operative to inoperative position.

21. In a machine of the class described, a carriage, a tabulator unit which comprises a series of interponents the first of which is in a normal raised position to be operated, means operated by the movement of the carriage to operate said first interponent, a series of tabulator keys, means operated by one of said keys to operate said first interponent, means operated by another key to operate another interponent, means actuated by the operation of the other key to move the first interponent from operative to an inoperative position and means operated by the actuation of any key to maintain the interponents in proper position during operation.

22. In a machine of the class described, a carriage, a tabulator unit which comprises a series of interponents, a series of lifting bars for said interponents, an actuating bail, a power-operated cam for actuating said bail, a latch for holding said cam inoperative, a magnet for releasing said latch, means connecting said magnet to the lifting bar of the first interponent, and means on the carriage for energizing said magnet at a predetermined point in the travel of the carriage.

23. In a machine of the class described, a carriage, a tabulator unit having a series of interponents, a series of lifting bars for said interponents, an actuating bail, a power-operated cam for actuating said bail, a latch for holding said cam inoperative, a latch releasing arm, a magnet for operating said arm when energized, said releasing arm also being connected to the lifting bar of the first interponent.

24. In a machine of the class described, a tabulator unit which comprises a series of interponents, a series of lifting bars for said interponents, all of said lifting bars except the first having shoulders, a releasing bail actuated by said shoulders when any one of said bars is lifted, and a switch associated with said releasing bail and normally closed when said bail is in inactive position.

25. In a machine of the class described, a carriage, a tabulator unit which comprises a series of interponents, a series of lifting bars for said interponents, all of said lifting bars except the first having shoulders, a releasing bail actuated by said shoulders when any one of said bars is lifted, a switch associated with said releasing bail and normally closed when said bail is in inactive position, an actuating bail, a power-operated cam for actuating said bail, a latch to hold said cam inoperative, a rocking arm associated at one end with said latch and connected at the other end with the first lifting bar, a magnet for moving said rock arm to release the latch and lift the first interponent, means on the carriage to energize said magnet, said switch associated electrically with said magnet whereby said magnet circuit is deenergized when any of the shouldered bars are lifted.

26. In a machine of the class described, a plurality of printing magnets, a movable carriage, an A. C. control switch, a common return control switch for said magnets, means for manually tabulating said carriage to a selected distribution column, a cam on the carriage and engaging said control switches as the carriage arrives in said column to close only the A. C. control switch as the tabulation ceases and the carriage comes to rest, a contact in a circuit parallel to said common return control switch, and means for manually closing said contact at the will of the operator.

27. In a machine of the class described, a plurality of printing magnets, a movable carriage, an A. C. control, a common return control switch for said magnets, means for manually tabulating said carriage to a selected distribution column, a cam on the carriage and engaging said control switches as the carriage arrives in said column to close only the A. C. control switch as the tabulation ceases and the carriage comes to rest, a contact in a circuit parallel to said common return control switch, a solenoid, the plunger of which is connected to said contact and which is adapted to be moved by the operator to close the contact, a locking circuit for said solenoid and established when the plunger is operated and a normally closed solenoid locking control switch engaged by the cam as the carriage moves out of the arrested position to open said switch and deenergize said solenoid.

28. In a machine of the class described, a plurality of printing magnets and a space magnet, a movable carriage, an A. C. control switch, a common return control switch for said magnets, means for manually tabulating said carriage to a selected distribution column, a cam on the carriage and engaging said control switches as the carriage arrives in said column to close only the A. C. control switch as the tabulation ceases and the carriage comes to rest, a return contact for said printing magnets disposed in a circuit parallel to said common return control switch, a return contact for said space magnet also disposed in a similar parallel circuit, and means for manually closing said two return contacts at the will of the operator.

29. In a machine of the class described, a movable carriage, a carriage return mechanism, manually operable means to initiate the operation of said mechanism, a pair of A. C. circuit switches in series one normally closed and the other normally open and means associated with said switches and made effective by the initiation of the carriage return operation to open the normally closed switch and immediately subsequent to close the normally open switch.

30. In a machine of the class described, a movable carriage, a carriage return mechanism, manually operable means to initiate the operation of said mechanism, a pair of A. C. circuit switches in series, one normally closed and the other normally open, means associated with said switches and made effective by the initiation of the carriage return operation to open the normally closed switch and immediately subsequent to close the normally open switch, an intermediate stop, and means cooperating with the stop and the normally closed switch to close said switch again when the stop is encountered whereby the A. C. circuit through said switches is completed.

31. In a machine of the class described, a movable carriage, a carriage return mechanism, a manually operable key to initiate the operation of said mechanism, a pair of A. C. circuit switches in series, one normally closed and the other normally open, a tabulator solenoid, normally open contacts in circuit therewith and associated with the normally open switch, means associated with said switches and made effective by the initiation of the carriage return operation to open the normally closed switch and immediately subsequent to close the normally open switch and tabulator solenoid contacts, an intermediate stop, and means cooperating with the stop and the normally closed switch to close said switch again when the stop is encountered whereby power is applied to the tabulator solenoid as long as the key is held depressed.

32. In a machine of the class described, a movable carriage, a carriage return mechanism, an intermediate stop, a manually operable key to initiate the operation of said mechanism, a tabulator magnet, a source of power, circuit connections between the source of power and the tabulator magnet, means operated by the key to close the circuit at certain points when the key is depressed and to open it at another point, and means operated when the intermediate stop is encountered to close the previously opened part of the circuit whereby the tabulator magnet remains energized as long as the key is held depressed.

33. In a machine of the class described, a movable carriage, a carriage return mechanism, an intermediate stop, a manually operable key to initiate the operation of said mechanism, a tabulator magnet, a source of power, circuit connections between the source of power and the tabulator magnet, means operated by the depression of the key to open the circuit at one point and to close it immediately subsequent at another point in series with the first point, and means operated when the intermediate stop is encountered to close the circuit at the first point whereby the circuit is completed and the tabulator magnet remains energized as long as the key is held depressed.

34. In a machine of the class described, a movable carriage, a carriage return mechanism, an intermediate stop, a manually operable key to initiate the operation of said mechanism, a tabulator magnet, a source of power, circuit connections between the source of power and the tabulator magnet, means operated by the key to disconnect the source of power as soon as the key is depressed, means also operated by the key to close a circuit to the tabulator magnet before the intermediate stop is reached and as long as the key is held depressed and means operated by the intermediate stop when encountered by the carriage to reconnect the source of power whereby the tabulator magnet is energized.

EDWIN O. ROGGENSTEIN.

Certificate of Correction

Patent No. 2,364,759.

December 12, 1944.

EDWIN O. ROGGENSTEIN

It is hereby certified that errors appear in the printed specification of the above numbered patent requiring correction as follows: Page 3, first column, line 50, for "them and their respective operating magnets" read *connections to the back-space magnet*; page 6, second column, line 7, for "provides" read *provide*; page 7, second column, line 49, for "Tabulator with (flick type)" read *Tabulator unit (flick type)*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*